C. E. FRITTS, DEC'D.
J. H. FRITTS, ADMINISTRATRIX.
RECORDING AND REPRODUCTION OF PULSATIONS OR VARIATIONS IN SOUNDS AND OTHER PHENOMENA.
APPLICATION FILED OCT. 22, 1880.
1,203,190.
Patented Oct. 31, 1916.
4 SHEETS—SHEET 1.
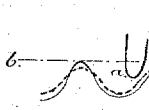
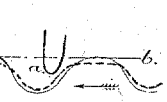
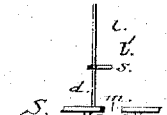
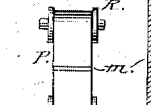
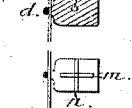
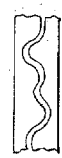
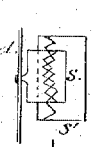
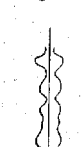
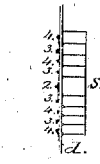
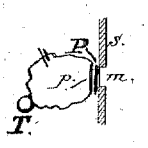
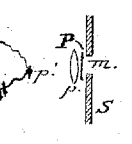
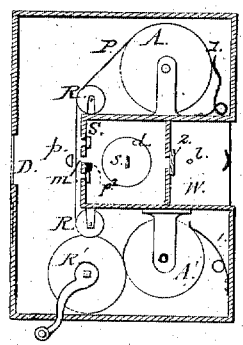
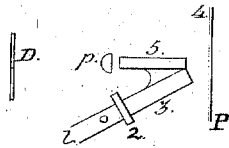
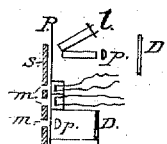
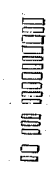
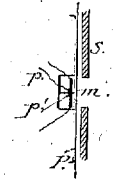
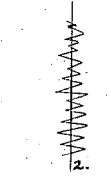
Witnesses:
C L Wilbur
R Sewell
Inventor:
Charles E Fritts

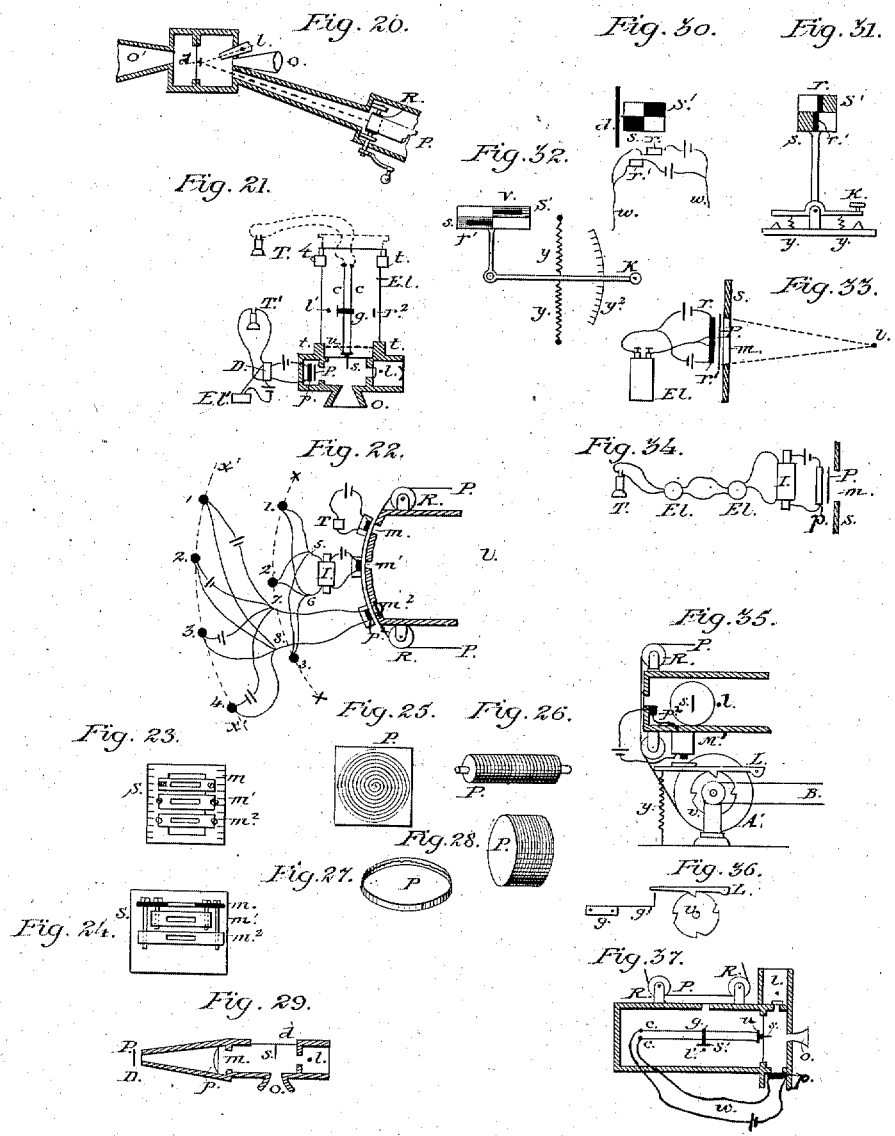

C. E. FRITTS, DEC'D.
J. H. FRITTS, ADMINISTRATRIX.
RECORDING AND REPRODUCTION OF PULSATIONS OR VARIATIONS IN SOUNDS AND OTHER PHENOMENA.
APPLICATION FILED OCT. 22, 1880.
1,203,190.
Patented Oct. 31, 1916.
4 SHEETS—SHEET 3.
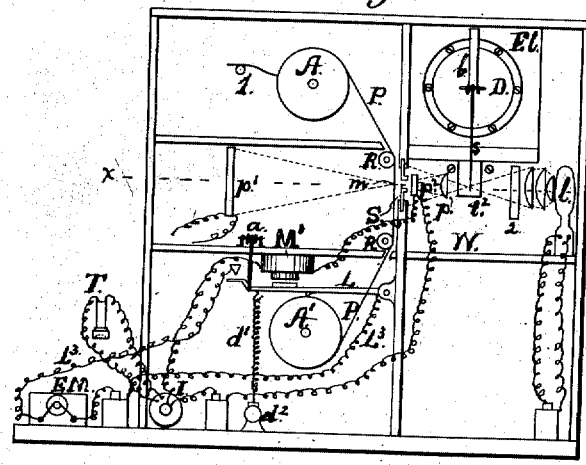
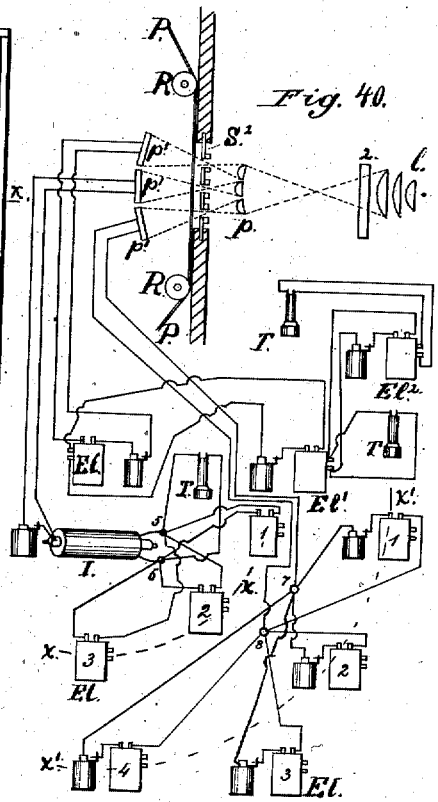
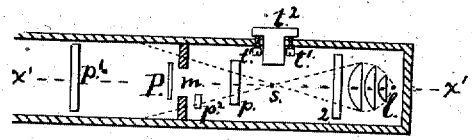
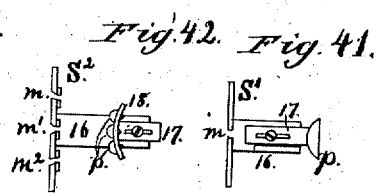
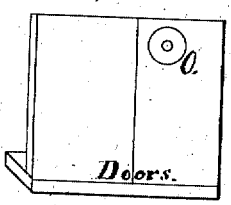
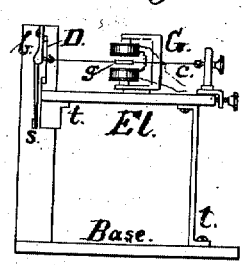
Witnesses:
W. H. Fuller
George Jackson
Inventor:
Chas. E. Fritts

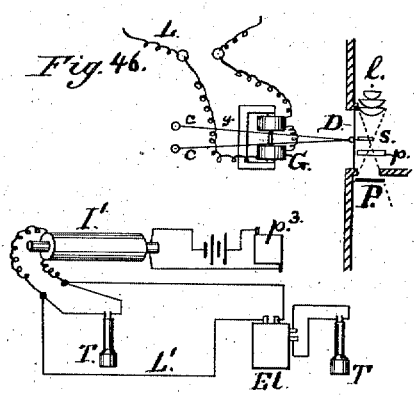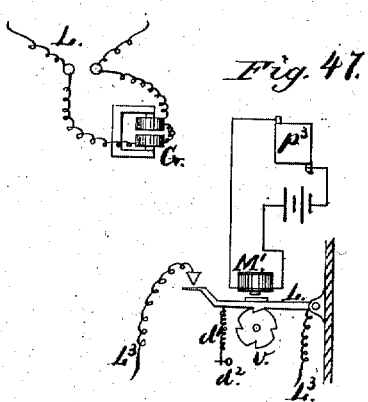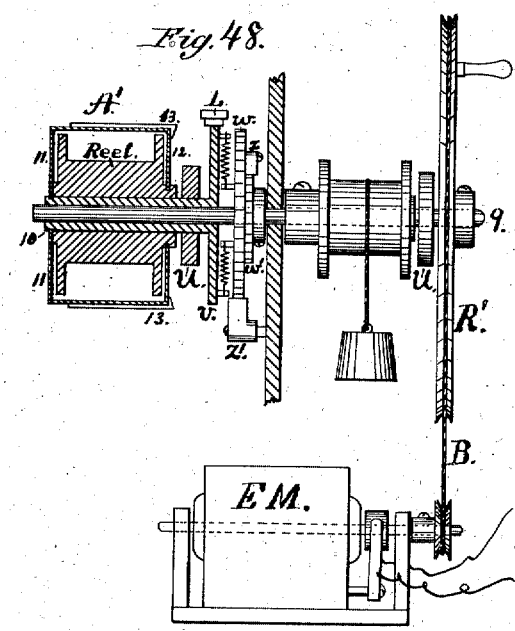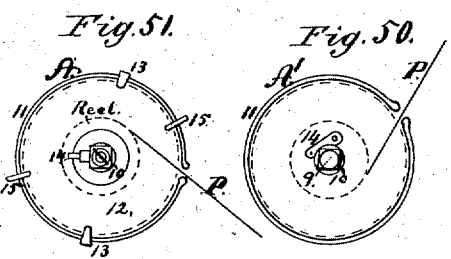

UNITED STATES PATENT OFFICE.

CHARLES EDGAR FRITTS, OF NEW YORK, N. Y.; JOSEPHINE H. FRITTS, ADMINISTRATRIX OF SAID CHARLES EDGAR FRITTS, DECEASED, ASSIGNOR, BY MESNE ASSIGNMENTS, TO JOHN D. MYERS, OF PHILADELPHIA, PENNSYLVANIA.

RECORDING AND REPRODUCTION OF PULSATIONS OR VARIATIONS IN SOUNDS AND OTHER PHENOMENA.

1,203,190.     Specification of Letters Patent.     Patented Oct. 31, 1916.

Application filed October 22, 1880. Serial No. 19,313.

*To all whom it may concern:*

Be it known that I, CHARLES EDGAR FRITTS, a citizen of the United States, residing at New York city, in the county of and State of New York, have invented new and useful Improvements in the Recording and Reproduction of Pulsations or Variations in Sounds and other Phenomena, of which the following is a specification.

This invention relates to recording variations or pulsations in sounds, light, or electrical currents, in a permanent or tangible form, and reproducing the same at will, not merely at the instrument alone, but also at any other instrument suitably connected therewith—and not merely in their original forms, but also changed as may be desired.

Several methods of recording are herein explained in order to justify broad claim and any suitable method may be used in connection with the other parts of my system.

The invention as described consists mainly in the application of photography and electricity for recording and reproducing such variations and pulsations by the aid of a diaphragm or equivalent device capable of vibrating under those influences and particularly under the influence of sounds, as hereinafter fully set forth. I have, therefore, termed it a photo-phonographic apparatus.

Apparatus for recording and reproducing sounds, commonly called phonographs, are not new, but they have been very imperfect—the practical difficulties preventing either a perfect record of the sounds or a perfect reproduction of them having been hitherto insurmountable. I have, therefore, sought to dispense as far as possible with mechanical methods and means in dealing with such subtle and intangible phenomena and have devised a new method of procedure and new apparatus for carrying out the same, which I claim in this application, by which I am enabled to exert and control any desirable amount of force for performing the different operations required by properly manipulating imponderable forces by means of devices which have of themselves a minimum force of movement, and which require exceedingly little force to move them. I thus obtain results which so far as I am aware have never before been obtained, as regards ease, certainty, rapidity, or accuracy, either in recording or reproducing sounds and similar phenomena.

Broadly speaking, my invention is based upon the laws governing the behavior of certain substances when exposed to the action of radiant energy. The action of actinic rays of light upon certain substances producing effects known as photographic need not be explained, as that method of utilizing radiant energy is well known and my invention does not relate to photographic processes, but any suitable or well known processes may be employed in the recording operations of my invention. Another mode of action of radiant energy is in changing electrical resistance, as shown by the action of light upon certain substances, notably selenium, whose electrical conductivity is well known to be greatly increased by exposure to light. Amorphous phosphorus is similarly affected and other substances are known which may be employed in like manner. I utilize this action of radiant energy for suitably controlling and varying electrical currents in different ways, but preferably by arranging the sensitive substance in a current-controlling device of an elongated form in the path of the rays from the source of light, and varying the quantity of light which falls upon it by varying the length of the illuminated portion of it. Having made this conducting substance a part of an electric circuit, and adapted the device to control the intensity and direction of the currents flowing through it, I vary its action upon the currents by means of a suitable device arranged across the path of the beam of light and movable lengthwise of the current-controlling device, whereby it will expose a greater or less length of the current-controller to light, in accordance with its own movements, and, consequently, with the phenomenon or influence which causes its motion. The resistance of a current-controlling device for the purposes of this invention may, however, be conveniently varied in many other ways of which I have herein named several.

A third mode of action of radiant energy which I utilize is the action of light upon certain substances, causing them to vibrate, and I have described and illustrated this part of my invention as being carried out by throwing the light, after being properly manipulated by my devices, upon thin plates adapted to vibrate under the action of varying light and made from suitable materials, especially of hard rubber. This action of radiant energy is believed to be due to the thermal rays of the light, as it is found to be best produced by heat rays acting upon substances which are highly athermanous or absorbent of heat. Any such substance may, of course, be utilized for this part of my process and I have named several which may be substituted for the hard-rubber plates or diaphragms. When the intensity of the light (or thermal rays) is caused to vary in accordance with the pulsations or sound waves constituting a certain sound, and this varying light is thrown upon a suitable substance, that substance is caused to vibrate in accordance with those changes in the actuating force and consequently gives out sound corresponding to those changes or pulsations. As a matter of course, the stronger the actuating influence is, the greater is the effect produced. I also increase the effect by amplifying the recorded variations of the original phenomena when recording them on the negative, as herein fully set forth, and then employ this "negative" for manipulating the light or actuating force before throwing it upon the diaphragm or other sensitive body. Such a negative will, of course, produce more marked and effective variations in the light, and more powerful vibrations in a sensitive substance exposed to its action.

In describing my process, I shall for convenience call the effective force "light", although I am aware that that term is not strictly correct. It is well understood that what is generally known as light is made up of rays or forces having different properties, as, actinic, or chemical, luminous, thermal, and possibly others. Even in the case of the photographic image and the metal selenium used in my process, it is not strictly correct to say that the effects are produced by "light" rays for it is known that they may be produced by rays which are not luminous, although they ordinarily accompany the luminous rays in light. I mean, therefore, by the word "light" both in this specification and in the claims those rays, forces, or forms of energy which produce the effects, whatever their name or nature may be and whether they are luminous or not. In like manner I include not only the particular substances named as sensitive to such influences, but any others which are known to be their equivalents or have the property of being similarly affected and which may, therefore, be utilized for the purposes of my invention in substantially the same manner as herein set forth.

I will now describe a method of carrying out my process which will show the nature of my invention. I first utilize the phenomena which I wish to record in themselves varying a beam of light, and then throw this varying light upon a sensitive surface moved uniformly along in the path of the beam, thereby producing an impression or image thereon, which I afterward treat in any well known or suitable way to render permanent and adapt it to reproduce the original phenomena. For instance, I cause a sound which I wish to record to impinge upon a vibrating diaphragm and so vibrate a shutter in accordance with its own pulsations or sound waves. This shutter is arranged to vibrate across a beam of light and interrupt or manipulate it, producing variations in the light in accordance with the original sound waves or pulsations. This varying light I then throw upon a suitably prepared sensitive surface, and record those variations upon it, as by photography. In order to secure a continuous record of these variations I confine the action of the light to a very limited portion of the sensitive surface, as by means of a slitted screen or partition, which stops all light except that which passes through the slit. This slit or opening is of any suitable length preferred, but the width of it is very slight. Thus, at any given instant, the light can reach only a long and very narrow section or area of the sensitive surface. Now, by moving the latter along uniformly past the slit in the direction of its width, successive portions are exposed to the light coming through the slit and record the successive changes in the light, thus producing a negative or record thereof in the form of a long, narrow strip. This negative I render permanent and adapt it to reproduce similar pulsations or variations as by making the parts acted on by light transparent and the rest opaque. Other ways are described or may be used for treating the negative which I now term the "pattern". Any phenomenon may be thus recorded which is capable of vibrating the shutter or varying the light or other force which acts upon the sensitive surface to produce the record as described. These phenomena may act directly on the vibrating devices or sensitive surfaces, or indirectly, or may be transmitted from any distance in the form of varying electric currents which are then utilized for vibrating the shutter or varying the beam of light.

The sensitive surface may be moved by any suitable means, either manually as shown in Figure 10, or automatically, as in Fig. 35. The latter is necessary, however, whenever accuracy is required; and to prevent waste of the sensitive surface by moving when nothing is to be recorded, I employ an automatic starting and stopping device which liberates the driving mechanism and stops it again at the proper times thus feeding the strip along only when needed. I utilize this "pattern" for reproducing the pulsations or variations recorded thereon, in different ways, as by causing it to vary a beam of light, to vary the resistance of electrical conductors, to produce vibrations in an athermanous substance, or otherwise, as may be preferred by the operator—for all of which I have given full and explicit instructions herein.

The following description will illustrate one way in which this principle of my process may be carried out. Supposing that the image or form on the pattern is transparent, and that the intensity or extent of the pulsations recorded thereby is shown by the varying width of the image at different points, I arrange the light to shine through the slit as when making the pattern (the shutter being now removed) and feed the strip past the slit at the same speed as before. It is evident that the quantity of light which can be passed through the strip at any point of its length, as it is moved past the slit, is governed by the width of the transparent image at that point (as seen in Fig. 4, where $m$ represents the slit or opening through the partition), and that the quantity of light passing through it will, therefore, be varied precisely in accordance with the original pulsations or phenomenon which controlled the formation of the pattern. If the original influence was a varying electrical current, we now have a beam of light varying in the same way, and can reproduce the variations of the original current by throwing this light upon a suitable current-controlling device, as a selenium cell, arranged in an elongated form like the slit, and varying its conductivity in proportion to the length of it which is exposed to light by the varying width of the transparent portion of the pattern or strip, as already explained. As the width of the transparent part before the slit increases more light will pass, a greater length of the selenium will be illuminated by it, its conductivity will be correspondingly increased and a stronger current will be allowed to flow through it and through the circuit of which it forms a portion—and vice versa. When the light is entirely cut off from the selenium, its resistance is so great that the current is (or may be) wholly prevented from passing through it. Thus the pattern can produce intermittent or undulating currents corresponding to the curves or forms upon it. In order to produce alternating currents, I arrange the selenium in two parts or sections, each section adapted to send whatever current penetrates it through the circuit in a positive direction. As the pattern allows one section to be exposed and lighted up, a current will be sent through the circuit in one direction, and vice versa; and in either case the strength of the current will be governed by the amount of light transmitted by the pattern. Any desired variations can thus be produced in electrical currents by using a suitable pattern. These currents can be utilized on the spot, or can be sent through the circuit to a distance, and, if desired, can be there repeated and sent on in a manner well known to electricians, and finally utilized in a telephone or electrical receiver of any kind.

One current-controlling device can have several adjusting currents conducted through it, and can simultaneously and similarly control them all. As each current can be sent through a separate circuit to a different place or places, I can simultaneously reproduce the sounds or other phenomena recorded on the pattern at all of those places.

In using the pattern, I am not limited to one slit, as in making it, but I employ as many slits through the screen or partition as may be desirable, and provide each slit with a selenium cell or other device for utilizing the light passing through the pattern at that point. It is evident that a given part of the pattern will pass before the successive slits at different times and that the greater the distance between two slits, the longer the time it will take the pattern to pass over one to the other. I employ the successive slits with their selenium cells for extending the area over which sound can be heard—for example, by producing the sound first at the instrument, by the light from one cell; then I utilize the light from the next cell (when the given part of the pattern reaches it) to send a corresponding current to a sound-producing device at a point where the original sound has become weakened by passing through the air; and in like manner I reinforce this fresh sound at a proper distance farther on, by a current from the third slit and cell, and so on, through as many stages as desirable. I adjust the distance between the slits so that the time occupied by the pattern in passing from one slit to the next will be the same as that occupied by the sound produced at one stage to pass through the air to the next. By this means, the current arrives at the latter point and produces the sound, at the same instant that the original sound is heard there, and the two combine without interference. In this way, I repeat the sound from stage to stage in any direction or in all directions at the same time.

Many other improvements are fully described herein.

Having thus given a general reference to the nature of my invention and indicated its main features I will now describe in detail the methods which may be employed for carrying it out and apparatus or forms in which it may be embodied, reference being had to the accompanying drawings forming a part of this specification and which show so much of my apparatus as is necessary to illustrate the invention herein claimed—each figure representing as much of the apparatus as is required for explaining or understanding the principles and operation of the parts intended to be illustrated thereby.

In these drawings: Fig. 1 is a diagrammatic view illustrating the defective result of attempting to produce a phonograph record by indenting the blank. Fig. 2 is an edge view of a speaking diaphragm having a shutter mounted thereon such as may be used in carrying out my invention. Fig. 3 is a view partly broken away showing a speaking diaphragm carrying a shutter, a source of light and a roller carrying a sensitive strip exposed to said light through an opening controlled by said shutter. Fig. 4 shows at the left a plan view of the sensitive strip and rollers and at right an enlarged plan view of a portion of the strip having the photographic record thereon. Fig. 5 shows two forms of shutter mounted on diaphragms which may be used in carrying out my invention. Fig. 6 is a plan view of a strip having thereon a sinuous record produced by the shutter shown in Fig. 5. Fig. 7 shows two additional forms of shutters which may be used. Fig. 8 shows the form of record produced by the shutter shown in Fig. 7. Fig. 9 shows a series of shutters mounted across the diaphragm with their edges meeting or overlapping. Fig. 10 is a vertical sectional view of one form of apparatus arranged for making the negative or pattern and moving it along by hand in carrying out my invention. Fig. 11 is a diagrammatic view showing means for reproducing and utilizing an opaque record by reflected light. Fig. 12 shows an electric circuit having a selenium bar therein adapted to be affected by light from my record. Fig. 13 is a similar view showing a flat selenium cell with a lens for concentrating the light from the record on it. Fig. 14 is a plan view of a partition having a series of light openings or slits therein for taking light from different parts of the record. Fig. 15 shows a record strip across a series of light openings and a plurality of means for utilizing or transmitting said record. Fig. 16 shows the photographic pattern produced by a succession of separate exposures. Fig. 17 is a similar view made by using a modified form of shutter. Fig. 18 shows two selenium cells arranged for exposure through a single opening to produce alternating current. Fig. 19 shows a record such as will be produced by the upper shutter shown in Fig. 7. Fig. 20 is a sectional view of an apparatus having a mirror on the speaking diaphragm for reflecting light to the record surface. Fig. 21 is a sectional view of an apparatus which may be used either for making or utilizing the record. Fig. 22 is a view more in detail of a plurality of means for utilizing a single record as shown in Fig. 15. Fig. 23 shows a plurality of light openings for a single strip with means for adjusting their relations or timing. Fig. 24 is a similar view of a modified construction. Fig. 25 is a plan view of a disk record having the photographic impressions thereon in a spiral. Fig. 26 is a perspective view of a cylinder having a spiral record thereon. Fig. 27 is another form of record having thereon a single circular pattern. Fig. 28 is still another form showing separate parallel patterns. Fig. 29 is a sectional view of an apparatus for taking and reproducing the record having a lens for concentrating the light upon the strip. Fig. 30 is a view of a divided shutter and two selenium bars for producing alternating current. Fig. 31 shows a modified form of divided shutter mounted as a key. Fig. 32 is a view of another arrangement. Fig. 33 is similar to Fig. 18 showing the electrical connections more clearly. Fig. 34 is a diagrammatic view showing means for producing, transmitting and repeating electrical impulses through several successive stages or circuits. Fig. 35 is a sectional view of an apparatus for receiving a message sent over the line including automatic starting and stopping mechanism for the receiving strips. Fig. 36 is a detail view of a portion of the stopping mechanism. Fig. 37 is a sectional view of an apparatus adapted to strengthen light pulsations which are recorded or reproduced. Fig. 38 is a general view of the apparatus disclosed in Fig. 10 but more in detail showing more clearly the arrangement and connection of the parts. Fig. 39 is a horizontal section on the line $x$—$x$, Fig. 38. Fig. 40 is a more complete detail view of the arrangement illustrated in Fig. 15. Fig. 41 shows means for adjustably mounting the lens in its relation to the slit or light opening. Fig. 42 is a similar view showing several lenses and slits. Fig. 43 shows a series of lenses each being separately adjustable. Fig. 44 shows the means for mounting and operating the diaphragm carrying the shutter in Fig. 38. Fig. 45 is a perspective view of the doors for the apparatus shown in Fig. 38. Fig. 46 shows the arrangement and connection of parts for receiving an incoming message. Fig. 47 shows the arrangement of parts for operating the starting and stopping mechanism at the receiving station by means of a selenium cell. Fig. 48 is a view partly in section of motor operated mechanism for moving the record strip. Fig. 49 is a detail sectional view of one of the reels carrying the strip. Fig. 50 is a view of a reel looking from one end. Fig. 51 is a similar view looking from the other end.

For convenience of description I will call my apparatus a phonograph, but I expressly declare that I do not intend thereby to limit the scope of my invention to what is commonly known as or done by the so-called "phonographs," or to narrow or restrict the scope of the invention in any way, but use the term merely for convenience.

The great trouble with phonographs heretofore is that they have undertaken to record and reproduce delicate air pulsations by mechanical means. In the first place, the diaphragm as heretofore arranged cannot possibly record the true form of the sound waves, nor even the actual mode of vibration of a free diaphragm under the influence of the sound pulsations. The vibrations of the recording point or tracer, in the center of the diaphragm, do not truly represent the vibration of the diaphragm at any point except at the center. And while it is practically sufficient for ordinary purposes, for other purposes it would be desirable to record the vibrations of the other parts of the diaphragm with their changing nodal points and points of maximum motion. This I accomplish by independent sectional shutters attached to different parts of the diaphragm each of which makes its separate record of the vibrations of the part to which it is attached, or otherwise. But even if the vibration of the center of the diaphragm truly represented the sound waves, it would be impossible for it to truly record them because the metal point thereto attached is hindered in its vibrations by the labor of impressing its motion in the foil or other material used in its place. This resistance not only retards the diaphragm itself, but it retards it in a very variable manner. When the tracer point reaches a soft, thin or unsupported spot in the foil, it moves farther than the average, while thick or hard spots, etc., reduce the motion below the average. A score of other faults could be mentioned, but the most important is that when the point is descending the pressure of the foil against its inclined forward surface retards the motion of the diaphragm; but when ascending it hastens or assists it, thus deforming the vibrations of the diaphragm itself. This will be understood by examining Fig. 1, where $a$ is the tracer point, with its front surface inclined backward to prevent clogging. The dotted line $b\ b$ represents the original level of the foil which is fed along in the direction of the arrow and the solid curved line shows the actual form of a supposed sound wave, while the dotted curve shows the form which the point will tend to make—and this discrepancy will be aggravated by the stiffness of the foil, the weakness of the vibration or the spring of the tracer and many other causes. As the perfection of the speaking depends entirely upon the exactness with which the natural sound waves are reproduced, it is evident that a method which does not record the correct form of a single one of the sound waves out of the hundreds or thousands which occur in each second of time to produce the sounds we hear, cannot possibly reproduce correctly the original sounds. All these difficulties I obviate by dispensing entirely with the tracer and its spring and the foil or any substitute for it; or any mechanical pressure devices whatever, for recording the sound-waves tangibly and employ means for recording the vibrations of the diaphragm which neither retard nor accelerate them, but will truly record the most extreme and violent or the gentlest pulsations and every one exactly as it occurred. This I do by causing the diaphragm as it vibrates to vary the quantity of light which passes through an aperture to a surface sensitive to light by which the sound waves are fixed and recorded. No matter how many or how different the sounds which have joined in producing composite sound waves which strike the diaphragm, the true number, intensity, and form of every one of them will thus be preserved unchanged by the process of recording. This record I call the negative and from it I can reproduce copies or duplicates in the same or other materials and can use it or them for the reproduction of the sounds recorded thereon. I also in the same way record any other phenomena such as signals, electric currents, and other influences capable of moving the diaphragm.

In the second place, even if the foil or matrix usually employed has been shaped exactly corresponding to the sound waves, it would be impossible to exactly reproduce those sound waves by moving the curved surface under a point attached to the sound producing or speaking diaphragm and causing the latter to vibrate, as is usually done, for several reasons; and even if it could, the excessive pressure of the point on the rising sides and tops of the curves soon wears them and changes their shapes from the true curves. No material now used could stand such use without being rapidly worn out of shape and destroyed. Moreover, the extreme rapidity of the vibrations renders it impossible to perfectly perform any mechanical movement, i. e., to apply force in a constantly varying manner and in opposite directions by mechanical devices with such rapidity and precision as is here necessary. The great desideratum is, wherever practicable, to avoid not only hand labor in making or finishing any of the parts, but to avoid merely mechanical devices entirely, and to provide means by which as much as possible of the work may be performed by the perfect-acting, unwearing, and swift-moving forces of nature. I, therefore, operate the diaphragm by throwing upon it light whose intensity is varied correspondingly with the form of our sound waves as described, which, as is known, causes a diaphragm to vibrate and produce the sounds corresponding to those waves. This I accomplish by passing a powerful beam of light through the negative I have before prepared, to and upon the diaphragm. This light passes through a narrow slit corresponding to the one used in making the negative, and by moving the negative along behind this slit at the same speed as when making the negative, it is evident that the original variations in the intensity of the light are exactly reproduced and if they are thrown upon the diaphragm, it will give out the same sound as that which originally caused it to vibrate. Thus, instead of trying to shove the diaphragm back and forth by machinery some hundreds or thousands of times per second, at a constantly varying speed, and making each motion exactly according to a prescribed pattern, each one of which may be different from any of the others, I accomplish the same end by the slow motion of a single piece or negative and causing that to control the action of a beam of light directed upon the diaphragm.

Instead of the light beam passing through a transparent negative it may be thrown upon an opaque negative and the image of the pattern be reflected therefrom and utilized, or the intensity of the light thrown upon the diaphragm may be automatically varied by the negative in many other ways.

In making the negatives, the sound to be recorded is caused to impinge upon a vibrating diaphragm, which is properly damped and arranged, as will be readily understood by those versed in telephony. To the center of the diaphragm $d$, Fig. 2, is fixed a vertical screen or shutter $s$ of mica or other light and stiff material being attached by its center and the outer corners rounded off a little to prevent their contact with the diaphragm during its backward vibrations, or to the left. It projects out at right angles to the plane of the diaphragm and is made opaque to prevent the passage of any light through it.

Fig. 3 is a vertical plan view; $s$ is the shutter, $d$ the diaphragm, $l$ is a powerful light throwing a beam of nearly parallel rays across the screen or partition S, which has a long narrow slit $m$ in it, through which the light passes and strikes the prepared surface, which in this case is represented as a strip of sensitized paper, fed at a regular speed over the rollers R R. As the diaphragm shutter $s$ normally stands, its edge shuts the light off from one half of the slit, and in vibrating it covers up more or less of the strip, according to the extent of the vibrations. The paper strip being carried along behind the slit $m$, Fig. 4, the edge of the shutter will describe a curved line at the junction of the part $e'$; not acted upon by the light, and $e$, which is acted upon; and by proper treatment the latter may be dissolved away or otherwise made transparent in any well known way, as will be at once understood by photographers. This curve or junction line, of course, represents the motion of vibration of the center of the diaphragm under the action of the sound waves or pulsations of the air. The forms of these waves as is well known, are the resultant of all the sounds which would be heard together if the ear was substituted in the place of the diaphragm and the prominences of the transparent part represent condensations of the air at the instants that those parts of the strip were behind the slit and exposed to the light passing through it while the hollows represent rarefactions produced by the sound waves or pulsations.

By varying the relative distances of the light, the shutter, and the slit or sensitive surface from each other, we can, increase the apparent amplitude of the sound waves as recorded on the sensitive surface, without changing their forms. For example, if we move the light from $l$ to $l'$ in Fig. 3 at half its former distance from the shutter $s$ or arrange the strip twice as far from the shutter, we shall double the amplitude of the curves on the strip produced by the vibrations of the shutter. In the same way, we can amplify the recorded vibrations in any other proportion desired, and the greater that amplitude is the more powerful will be the effect of the negative or pattern when employed in reproducing phenomena recorded thereon. And it must be understood that in all cases the relative distances of the parts are to be such as will enable the minute vibrations of the diaphragm and shutter to produce upon the record curves having sufficient amplitude for working purposes. This method of amplifying the vibrations is often important and can be applied for strengthening plusations or variations in light or electrical currents as well as in sounds. I would here remark that the diaphragm and shutter may be caused to vibrate not only by the direct impact of sound pulsations, as before described, but also by other means, as by magnetic attraction, connection with vibrating bodies and the like. This is illustrated in Figs. 21 and 37, which show the combination of my telephone and the phonograph, as fully hereinafter described. My apparatus is capable of recording any phenomena which can actuate the shutter or device which varies the beam of light,—and that device may, of course, be actuated in any suitable manner, as will be in the precise manner described.

Instead of a shutter manipulating the light rays we may use a plane mirror attached to the center of the diaphragm and place the light in front but a little to one side; the light beam will be reflected to the other side of the center, or normal, as seen in Fig. 20, where the light from $l$ is properly directed upon the mirror and reflected through the tube and the slit $m$ upon the strip P. Now, when the diaphragm vibrates the spot of light, it will also change its position, and the amplitude of its vibrations will be greatly increased by the angle between the light and the central line or axis of the mirror. The amplitude of the curves can also be increased to any extent by removing the strip P to a suitable distance from the mirror, as described with the shutter. But I prefer the way before described for making negatives for this purpose, although any suitable method may, of course, be used which will accurately record the forms of the sound waves upon the negative—which is the object sought.

If, instead of an opaque shutter on the diaphragm, we have a vertical transparent strip across said shutter, the light will reach the paper strip behind the screen only through the intersection of the two slits in front of it, forming merely a square spot of light, as shown by Fig. 5 at the intersection of the two slits $n$ and $m$. The vertical slit on the mica should make the light beam of about the same width as the stationary horizontal slit in the screen. As the diaphragm vibrates and the paper is moved along, we produce (after dissolving out the parts exposed to light, blacking the rest, soaking in oil or otherwise rendering it transparent) a narrow, transparent curve on the paper strip, as represented in Fig. 6. Instead of the vertical strip, we may use a transparent spot at the point which will fall on the center of the stationary slit when the diaphragm is still, as seen at $n'$ on the upper shutter shown in Fig. 5. This also makes a negative strip, like Fig. 6. Another way is to have two shutters, one on the diaphragm, as before, only larger, and the other stationary and parallel to but not touching it. These shutters are painted, or otherwise treated to make them opaque up to a certain point, the rest being transparent. These opaque edges are notched so that at their junction they lap so as to form square or diamond spaces which are transparent, as in Fig. 7, where $s$ is the vibrating shutter and $s'$ is the stationary one. In this case, the slit in the screen before the paper strip is placed vertically and the paper is fed past it horizontally. Consequently, as the movable shutter $s$ is vibrated to and fro before the other, these transparent squares or diamonds become alternately larger and smaller. But they should not quite meet nor be quite extinguished even by the greatest vibrations of the diaphragm. The result is to produce on the opaque negative strip transparent lines of varying width, one of which is shown enlarged in Fig. 8. If a narrow beam of light is sent through it, it will be more or less obscured at different places along the strip, i. e., the quantity of light allowed by the transparent parts of the strip to pass through the slit will be increased or decreased corresponding exactly to the pulsations of the diaphragm (or the sound waves) not only in number and intensity, but also in the form or manner of vibrating.

At 2, Fig. 8, is seen a fine opaque line in the middle transparent strip. This is made by placing a fine wire across the center of the stationary slit $m$ to stop the light and indicate the center of the negative strip. Its convenience will be manifest. In practice, the stationary notched shutter $s'$ is not necessary as the slit $m$ is sufficient in connection with the vibrating notched shutter, as seen by the lower figure in Fig. 7 which shows how the lateral vibration of the shutter with its transparent notch will vary the amount of light passing through the stationary slit $m$.

When desired to copy the pulsations of the diaphragm with the greatest possible exactness and completeness, the shutter should be divided or sectional, and each section may be notched like the lower shutter in Fig. 7 and will produce on the negative its own independent bulbous record like that shown in Fig. 8, although there will of course even in this instance be some overlapping of records.

In Fig. 9 $d$ is the diaphragm, 2 is the shutter at its center and 3 and 4 are other small shutters attached to different parts of the diaphragm. Each shutter having its own slit $m$ and producing its own individual record or pattern strip as already explained for the single shutter, each one being arranged as described for shutter S, would make its own wave or record of the vibrations of that part of the diaphragm to which it was attached and all of them would thus show the movements across the whole diaphragm, and the relative times and positions of the nodal points. In this way, it is evident that the action of all parts of the diaphragm will be correctly recorded on the negative and, as the nodal points change from one section to another, as different sounds act on the diaphragm, so will the bulbous lines on the negative change their forms. And when they are in turn caused to vary the light thrown upon a speaking diaphragm D, Fig. 10, they will reproduce the original pulsations of diaphragm $d$ with its varying nodal points and will correspond more closely to the original than would be the case if only the vibrations of the center of the diaphragm were recorded on the negative. The shutters are easily attached to the diaphragm by their centers and being inclined slightly somewhat like the slats of a window blind, similarly to the closed slats of a window blind, their edges will lap without touching each other.

It is evident that when a correct negative is once obtained perfect copies can be produced not only by photographic, but also by ordinary printing processes, or even by mechanical means at a merely nominal cost, even for the most elaborate negatives.

Having thus explained the principles of my invention, Fig. 10, represents an apparatus which I have devised for carrying out my method arranged more particularly for making negatives or patterns. At A is a roll of the prepared negative strip wound upon a bobbin which is mounted in journal bearings in any convenient way. This strip may be of any suitable thin and flexible material which may be strong fine paper, but I prefer what is known as paper parchment, although many other substances may be used. It should be covered with a thin film made very sensitive to light by any of the instantaneous processes employed in photography, although a dry process will be most convenient with this form of negative. After being properly coated and sensitized, it should be carefully dried, rolled up, and protected from light or damp until ready to use it. It may be thus coated and sensitized either before or after being cut up into strips of width suitable for use, but in the latter case, care must be taken in the cutting not to disturb the adhesion of the film to the strip. A suitable width is 1/2 or 3/4 inch and the length will, of course, be governed by convenience or the choice of the operator.

The roll A is free to turn, being held only by the spring 1 pressing upon it sufficiently to prevent it from turning faster than the strip is needed. From A the strip passes over the flanged rollers R R, Figs. 3, 4 and 10; at R' is a rubber-faced roller which presses the paper strip between itself and R tightly enough to prevent the slipping of the strip. It also fits between the flanges of the roller enough to carry that along with it. If desired, it can also press lightly on the roller A' to assist in rewinding the strip upon it. To this roller can be applied the power which feeds the strip along before the slit $m$ in the screen or partition S. For experiment or common telegraphic purposes a crank may be attached to the roller R' or R, as shown in Fig. 10, or the strip may be otherwise fed by hand. But when accuracy is required, some motor should be employed which will give the negative a perfectly uniform and known rate of speed. These are not new and need not be described, as they form no part of my invention. The motor may be attached to or contained in the box or frame of the phonograph or otherwise connected as preferred. The strip being thus fed along at a uniform speed it is wound upon a second roller A' or may simply be fed loosely into the bottom of the box or case of the phonograph after exposure to the varying light. It will now remain unchanged if kept from light and damp, for days or even weeks, or, on the other hand, it may be at once developed, intensified, fixed, or otherwise treated to render the image permanent,—according to the process employed or the effect desired. All of which will be at once understood by those versed in photography, who will be enabled from the foregoing description to readily make a negative strip having the characteristics required and will probably prefer the gelatino-bromid process. If the paper seems to have a greasy nature, it may, before applying bromid emulsion, be coated with four per cent. solution of white of egg to which sufficient chrome-alum has been added to give it a slight bluish tinge. This will insure the film adhering perfectly. But it will seldom be required if a good quality of paper or parchment is used. These strips being fixed, they may be treated and used in different ways. The parts acted upon by light may be made transparent and the rest blacked and rendered more opaque and the strip used by transmitting light through it; or the strip may be left opaque and used by reflected light—in which case the parts acted upon by light should be made as white or brilliant, and those not acted upon as black and absorbent of light as possible, all of which can be done by any one out of many well known ways, and detailed directions are not necessary. For example, a strip to be used by transmitted light may have the dark parts blacked with carbon-ink, flexible black varnish, or otherwise, and the lights rendered transparent by dipping in castor oil thinned with absolute alcohol. The finished strip being again wound upon the wheel or roller A and properly arranged in the phonograph, we can reproduce the original variations in the first beam of light, in another beam of light, by feeding the strip before the slit *m* at the same speed as when making the negative and throwing the beam of light through it as it passes the slit. To do this, the diaphragm *d* with its shutter is removed—the upright frame which holds it being arranged to slide on a foot-piece which fits in grooves so that it may be slid into its place for use, or moved back out of the way, as desired.

Fig. 21 is a horizontal sectional or plan view of the apparatus (arranged for reproducing the sounds or phenomena recorded in the negative or pattern), and shows the shutter and diaphragm carried on the same frame or base as the telephone E*l*, which slides in grooves in the pieces *t t*, and the dotted lines show the position of the base when slid back far enough to get the shutter out of the way for our present purposes, but not admitting any light to the interior of the apparatus. The mouth-piece O is, of course, closed when thus utilizing the negative. The square chamber which contained the diaphragm is now empty or free and allows the light *l* to shine unobstructed across it to and through the slit *m* onto and through the strip which is rapidly fed before it, whereby the light which passes through the strip is varied in precisely the same manner as the original beam of light was varied by the shutter on the diaphragm *d*, *i. e.*, the greater the proportion of the strip which is transparent, the longer the beam of light which is passed through it, and vice versa (see Fig. 4). This light can now be used to produce corresponding variations or pulsations in sound, electric currents, magnetic attractions, etc., as desired. We can reconvert this varying light into sounds in different ways. It may be passed through a plano-convex or, rather, plano-cylindrical lens *p*, Fig. 10, or any suitable optical devices to widen and disperse it properly and be thrown directly upon a thin hard-rubber diaphragm D properly arranged for speaking or giving out sounds. Or, in place of the lens *p* a selenium bar or cell may be arranged to receive the light and thereby vary a current of electricity flowing through it, as shown at *p* in Fig. 21, which current may then be conducted to one of my telephones (described herein) which is substituted for the diaphragm D and the sounds will be produced by it with any desired loudness, or the current may be conducted by wire to any other instrument or place in the same way as in telegraphy and there converted into sounds or utilized for any other purposes, as in Fig. 21, where a current from D is represented as conveyed to a telephone T' at one place and to an electrical receiver in any suitable kind E*l'* at another place.

When selenium is used for receiving the light and varying an electric current, it may be either in the shape of a bar *p* covering the slit *m*, as shown in Figs. 12 and 21, or that of a flat cell *p'* in Fig. 13, where the light passing through the negative or pattern D and the slit *m* is converged by the lens *p* to a focus, upon the selenium cell *p'*. Or, for producing an intermittent current it may consist of two selenium cells or bars suitably arranged as shown in Fig. 18. The same arrangement is used in connection with patterns like Figs. 4, 8 and 17 for producing alternating currents or undulating currents of alternately opposite polarity. The two cells are arranged end to end with their approximating ends at the central line 2 of the pattern strip so that one cell or bar is opposite one half of the slit *m* and the other bar or cell opposite the other half. Each cell is arranged to send whatever current flows through it in a direction opposite to that of the current from the other cell, in any well-known or suitable manner and each may be supplied with its current from different ends or sections of the same battery or from separate batteries, as shown in Figs. 30 and 33, where the two sections of the selenium are inserted in derived circuits or branches of the main circuit *w w*. In either case, the electric current is arranged to flow through the selenium by proper conducting wires and the varying quantity of light which falls upon the selenium will correspondingly vary the current flowing through it, as is well known to electricians.

A strip or pattern, like Fig. 17, thus employed, will produce an alternating current, whose changes of strength and polarity will be sudden or instantaneous—for each section of the cell will be at once lighted for the whole length of the signal or form on the strip, then as suddenly shut off from all light, and the other cell or section will be lighted and operated by the form on the opposite half of the pattern strip. A pattern like Figs. 4 or 8, however, produces the changes of strength and polarity gradually. When designed to be used with a divisional selenium cell, they should, of course, be made by a divisional shutter on the diaphragm, as shown in Fig. 30. In using such a shutter to produce negatives, it should be arranged so that the central vertical line or division of the shutter will fall on the central line of the slit *m*, which should also be made preferably in two parts in different planes, as shown by the position of *r* and *r'* in Figs. 30 or 31. When arranged as in Fig. 30, the opaque part *s* of the shutter stands between the light and the part *r'* of the slit and *s'* covers up the slit *r*, as will be understood from Fig. 32, where the parts are so arranged. Now, when the shutter vibrates to the right, *s'* uncovers more or less of slit *r*, and when moving to the left, the part r' of the slit is similarly exposed by the removal of s. The sensitive surface being fed down past the slit, a pattern is produced like Fig. 4 or 8 but with the two halves independent, and possibly, dissimilar,—each corresponding to the movements of its own half of the shutter. By now moving this pattern (when finished) past the slit again after arranging a sectional selenium cell behind it with each section of the selenium behind the corresponding section of the cell (and the shutter being now moved back out of the way) we produce alternating currents whose variations in strength and polarity will correspond to the original vibrations of the shutter and, therefore, of the force which moved it—the principle involved in making and using the pattern being precisely the same as already described. I would here remark that the method of constructing selenium cells is now well understood and any known or suitable method or arrangement may be employed.

The negative may, of course, be taken on glass instead of paper and arranged to be properly moved before the slit and light. Any suitable material may be used, whether transparent or opaque, flexible or rigid, plane or curved. When the negative strip is required to be very narrow in order to save room instead of the light falling directly upon it, the varying light beam may be received upon a lens and converged to the desired size before being thrown upon the sensitive surface. The negative in Fig. 10 would then be fed along at D instead of between p and m. Or, in Fig. 13, the negative would be at p' while receiving the photographic impression. Fig. 29 illustrates this arrangement. The light from l, after being varied by the shutter s, passes through the slit m and is converged by the lens p and then falls upon the negative P. Of course, the same arrangement may be used with a speaking diaphragm D or other suitable device substituted for the negative or sensitive surface. As the interior of the camera is thoroughly blacked, as already stated, it absorbs all superfluous light and improves the effect.

When using an opaque strip or negative, the sound waves or, rather, the variations of light produced by them are recorded in the same way as already described. But to reproduce those variations the strip is fed along with the printed or formerly sensitive side outward in the path of a beam of light by which it is powerfully illuminated and the light reflected from it is utilized instead of transmitted light. Fig. 11 shows an arrangement which may be employed. l is the light which passes through the alum-water cell 2 through the tube 3 and illuminates the moving strip or pattern 4 or P. 5 is a tube with blackened interior, each end having an aperture corresponding to the slit m which would be used with a transparent pattern and so directed toward the strip that only the light from that part of the strip which would be covered by the slit m can pass through both apertures—all of which will be readily understood by photographers. This light is then received by the lens or other suitable optical device p and properly thrown upon the diaphragm D as before. The lens p may be replaced by the selenium bar or cell and the diaphragm D by one of my telephones, etc., exactly as before described for transmitted light. The distance of the illuminating arrangement from the negative strip is merely sufficient to thoroughly light up the field covered by the tube 5. Tubes 3 and 5 may be of any suitable size, length, and material, all of which may be left to the judgment of the operator, who should arrange the apparatus according to good photographic practice. By following the directions herein given nothing more than good judgment is needed to enable any one skilled in photography to attain perfect success either in making negatives by my method for any desired purpose, or in practically using them afterward.

Instead of a negative arranged as before described, it may be made alike across its whole width and its transparency varied so as to be more or less opaque at different parts of its length. Or an opaque strip may be similarly varied from white through all the shades to black so that a given cross-section of the strip will reflect more or less light at different points. Such strips will light up the whole length of the selenium or other device all the time and operate by the varying intensity of the light instead of by varying the length of the cell exposed to light. Or the strip can be so prepared as to show analogous gradations of phosphorescence, when suitably treated, and throw out a light of greater or less strength corresponding to the variations in the beam of light originally employed in making the negative whereby it will be enabled to reproduce those variations at any time, which is the object and function of the negative or "pattern". Or, the desired effect can be attained in many other ways. But for photographic and other reasons, I prefer that the negative be made as before described, with the different portions entirely distinct and with the part that is transparent or white made as transparent or white as possible, and that part which is opaque or black made as strongly so as practicable. The pattern may be made upon a long narrow strip, as described, or arranged spirally over the surface of a plate, as in Fig. 25, or a cylinder of any suitable size, shape and material, as in Fig. 26. By making it in a circular form, as in Figs. 27 and 28, and running it around, it will continue to repeat the same sound, word, or phrase, as long as it is turned. Fig. 27 is a strip having a single pattern or image upon it while Fig. 28 has a number of parallel images or patterns; the ends of the strip are properly cemented or fastened together.

Instead of the hard-rubber diaphragm D one of celluloid may be used, also soft vulcanized rubber, thin elastic brass, and German silver, and other materials which are capable of being vibrated or acted upon, as described, when properly exposed to the varying light or other rays. The diaphragm $d$ may be made of any of the materials used in telephony, which are suitable for the employment to be made of it in this process.

The light employed for making the negative should be strongly actinic and may be direct sunlight or electric or other artificial light having sufficient actinic power for instantaneous photography. It should be arranged in a chamber W, preferably with a reflector or other means for making the rays nearly parallel, i. e., into a beam suitable for the purposes of this invention, and only this beam should be admitted to the diaphragm chamber. The rays may proceed directly from $l$ (Figs. 3 and 10) as a luminous center, or they may be brought to a focus at any point between $l$ and the shutter $s$, as seen in Fig. 3, where $l$ and $l'$ represent two such foci with the method of amplifying the effects produced by the vibrating shutter—the luminous center or focus being advanced nearer to the shutter until the desired amplification is effected. The effect is practically the same, whether a luminous point is placed at $l$ or a beam of rays is brought to a focus there and diverge thence sufficiently to cover the slit or slits $m$ through the partition S of the diaphragm chamber. At 2, Fig. 10, they pass through a glass cell filled with alum water to stop the heat without diminishing the light. They then pass through an aperture of suitable size across the diaphragm chamber where they are manipulated by the shutter $s$ and through the slit $m$, as already described. For using the negative so strong a light will not always be needed and a good kerosene lamp will answer for most ordinary purposes. Gas light is not suitable unless a steady flame can be obtained, as a flickering light will interfere with the perfection of the speaking. For purposes requiring accuracy, however, a light should be used having ample actinic power and the stronger the better. No harm can be done by having a light unnecessarily strong, as it can not be strong enough to do any harm, although proper care must, of course, be taken when the alum-water cell is not used to avoid the injury of the pattern or other device by the heat rays contained in the light. And I would here remark with regard to the alum-water cell or its equivalent that, although not essential, its use will generally be found advantageous in making a photographic pattern and in using a pattern in connection with selenium cells. But when other substances or devices are used which are sensitive to other forms of radiant energy, its use may be needless and even objectionable as stopping the very kind of radiant force which acts upon the sensitive substance or device. It should, therefore, not be used in connection with a hard-rubber speaking diaphragm or in other cases where the heat rays are the acting force concerned. It is also found by experiment that the effect is improved by using a mirror or reflector instead of the lens $p$, Figs. 10 and 11, when the rays are intended to act upon a rubber diaphragm or other device operated by the thermal rays of the light. These hints will enable the operator to use or omit these parts according to the use he is making of the apparatus.

The whole apparatus is inclosed in a close box or casing, as shown in Figs. 10, 20, 21, and 29, to exclude external light, particularly from the negative. The light chamber W should be so tight that none of the light can penetrate the partitions around it except through the cell 2. The diaphragm chamber is also inclosed on all sides except the one facing the sounds to be recorded and the only opening on that side is through the bell or mouth-piece O conducting the sound to the center of the diaphragm. All the interior surfaces are made densely black in order to absorb and prevent the reflection of any light that may find its way inside. Suitable openings or doors are provided wherever necessary for giving access to the different parts which may be arranged to suit the convenience of the operator. This care about the light is required more especially while making the negative. For speaking purposes, much less caution is needed. When the apparatus is used to enable one light to control another and stronger one, the former is thrown upon the other side of diaphragm $d$ which controls the light $l$, as illustrated in Fig. 20, where a properly varied beam of "light" from the left may act upon one side of the diaphragm $d$, which then varies the light coming from $l$ by means of the mirror shown attached to its right side. It can, of course, control such light also by the usual shutter, or other devices, before described. O and O' are mouth-pieces or openings, one on each side.

When the instrument is used for speaking or playing in a large hall or in the open air, the sound, even if much louder than the original, will become inaudible at a distance from the phonograph. If desired to extend the area over which the speech, music, or other sound will be heard, it can be done and to any extent by taking sounds off from different portions of the negative or strip at the same time. For example, if the music is indistinctly heard at a distance of 100 feet from the phonograph, I reinforce it so as to be as loud as at the instrument itself by taking the sound off from the negative strip through a second slit below the other. We know that sound travels in air about 1100 feet per second. It would be heard at a distance of 100 feet or 1/11 second later than at the instrument. In order to send on a fresh sound and have it arrive there at the same time as the original sound so that there may be no interference between the weakened original sound and the powerful new sound, but both may join and coincide we take the new sound from the strip 1/11 second later than the original. If the strip travels eleven inches per second, we simply adjust the second slit $m'$ just one inch below the other $m$, Figs. 14, 22, 23, 24, arrange the light to shine through both slits at once, receive the light from $m'$ upon a selenium bar or bars, conduct the current to the point where the sound needs reinforcing, and there convert it into sound by one of my telephones or any other suitable arrangement. It is evident that any given part of the strip will pass the slit $m'$ 1/11 second after it passes $m$ and the same with any other distance. The strip is not really fed along so rapidly, but the proportion should be the same between the actual speed per second and the distance to be covered. Should it be desired to again reinforce the sound, say, 75 feet farther on, we add another slit and selenium $m^2$ 3/4 inch below $m'$ and so on indefinitely. In this way, the speech or music from my instrument can be extended over as large an area as desired and in all directions so as to be perfectly heard in every part. One selenium bar is capable of carrying a number of different currents at once, each one sufficiently powerful to operate a loud-speaking telephone or analogous apparatus and each one will be similarly and simultaneously acted on by the varying beam of light and varied correspondingly by the selenium bar or cell. Fig. 22 is a diagram of the arrangement and electrical connections. The light which passes through the slit $m$ produces the first or original sound at the instrument or any central position preferred, as by a loud sound-producing apparatus at T. The light passing through the next slit $m'$ acts upon a selenium or other current-controlling device and sends out currents which will reinforce the original sound at the distance, say, of the circle $x$—$x$, where it is shown as reinforced at three different points in that circle. These second sounds are reinforced at the next stage or circle $x'$ $x'$, at as many different points as desired—shown as four— by currents produced by the light which passes through the third slit $m^2$ and acts upon a current-controlling device $p^2$, through which flow the currents which actuate the sound-producing apparatus at the stations 1, 2, 3, 4.

The current from the cell at the second slit $m'$ is shown as passed through the primary wire of an induction coil I, the secondary coil of which sends an induced current through the different sound-producing apparatus shown as arranged to be each actuated by a division of the current. The entire current may, of course, be sent through all the instruments in succession. So also can a single current from the cell $p^2$ be sent through all the instruments in the circle $x'$ $x'$—instead of arranging a separate current for each and controlling all of the currents by the cell $p^2$, as shown.

5, 6, 7, 8, are the points where the two circuits are divided into branch circuits; but the main circuits need not be divided at all, but each one may extend to and connect directly with the cell $p^2$ or coil I.

Any suitable electrical connections and any suitable form of currents may be employed as well understood by electricians. For such purposes, a slider or composer is arranged in the partition S, Figs. 10 and 22, having the slit $m$ at the top and others arranged at the desired distances below. A separate slider can be inserted for any new modification in the distances to be allowed for. If great accuracy is required in meeting some special case, the slits may be formed in movable pieces, which can be adjusted to and from $m$ by screws with any desired minuteness, as shown in Figs. 23 and 24. In the former the slide S has marks along its edges for adjusting the position of the pieces carrying the slits which are then secured by the screws as shown. In Fig. 24 the slitted pieces are adjusted to and from $m$ by screws through their ends held by a ridge level with the slit $m$. When the currents are to be sent to a distance or not to be heard simultaneously no such care is needed, but any desired number of slits can be used, and at any convenient distance apart, each with its selenium or analogous device, and each selenium can conduct and control a number of separate currents thus multiplying the number of separate currents that may be simultaneously taken off one strip or negative indefinitely.

In Fig. 15 several slits are shown through the partition or slider S. The bottom one throws its light on a lens which concentrates it to a focus on a selenium cell, as shown, which is connected with a telephone by the conducting wires as usual. The next one above throws the light upon the lens or other device $p$, which spreads or causes it to properly cover the diaphragm D for speaking. The two slits above illuminate two selenium bars, with their conducting wires for sending the currents to different instruments or places. At the top is shown the arrangement for speaking by reflected light. The slits may be arranged and used in any manner desired.

Instead of using the lights from the different slits for different purposes, as shown, the slits may all have selenium bars or cells behind them, or the lights passing through them may be utilized for any purposes desired.

Each bar or cell should be so inclosed as to protect it from all light except what comes to it through its slit. When any selenium is not wanted for use, its slit can be covered with a slide, as in Fig. 10, where only the central slit is used while making a negative or pattern, the slits above and below that being closed by their slides. In Fig. 22 the slit $m^2$ is shown with its slide in position ready to be shoved down and cover the slit, or the selenium merely disconnected from the line or conducting wires, or by opening the circuit. When quite a number of slits are to be used at once, they may be arranged in a curve with the light in the center and the paper strip rest on a curved glass surface to support it and keep it in position. This curved form of slider is seen in Fig. 22. In this case the side of the strip which carries the image should be outside to avoid rubbing it over the glass. It will, therefore, be seen that I can at the same time convert the forms recorded on the negative into sounds and transmit them elsewhere; I can transmit them to any desired number of places simultaneously; or I can take off the sounds any desired number of times and reproduce them with any desired intervals of time between the successive series or repetitions of the sounds, signals, or other phenomena which are being reproduced, or I can convert the varying light which passes through into any desired number of correspondingly varying electric currents, each having any desired strength, and each of which can be utilized for any desired purpose.

By arranging the diaphragm $d$, or its shutter $s$, to be operated manually, feeding the strip slowly and vibrating the shutter in a manner similar to that used in sending the ordinary Morse signals with the ordinary key, the result would be a strip like Fig. 16, with transparent lines across it. The shutter can, of course, be actually arranged on a sort of key and be vibrated manually before the slit $m$ to intercept the light properly. Fig. 31 shows this device adapted for producing alternating currents. The parts $s$ and $s'$ are opaque, the rest of the shutter transparent. The black bodies $r$ and $r'$ represent the two sections of the slit $m$ which are normally covered or protected by the opaque portions $s$ and $s'$. But when the key K is operated to move the shutter to the right it uncovers the section $r$, and vice versa, thus producing the pattern precisely as already described, only it is now done manually instead of automatically. By arranging the shutter like Figs. 5 and 32, to be moved in both directions from the center and to different distances for the different letters or signals, a strip like Fig. 17 would be made. Fig. 32 shows the key or lever K for moving the shutter, the proper distances being indicated by the scale $y^2$. The springs $y$ $y$ keep it normally in its central position and when moved to either side it uncovers one of the sections of the slit $m$ precisely as described for Fig. 31 and the farther the key is turned on its central pivot the more of the slits or openings are uncovered by the shutter and the greater the length of the beam of light allowed to pass through to the sensitive surfaces behind the slit. Or the pattern strip could be punched out or otherwise produced by hand in the manner now practised for automatic telegraphing. Such a strip prepared in either way can then be run through my instrument at almost unlimited speed and the signals will be perfectly produced by the light being varied during its passage through the strip and then falling on two selenium bars or strips or other current-controlling devices arranged behind the slit $m$, producing correspondingly varying currents, which are then sent over the line or other currents induced by them sent instead to another phonograph or to one of my telephones or other apparatus, as shown at El in Fig. 33, where P is the pattern or strip moving past the slit $m$ in the partition, S, and $r$ and $r'$ represent the two sections of the slit with the sectional current-controlling device arranged behind it—each section, when lighted, sending a current of opposite polarity through the circuit. When the speed is so great that the sounds or signals are unintelligible to the eye or ear at the receiving station they may first be recorded by one of my phonographs and the negative so prepared be then run through another phonograph, (or telephone), at the ordinary speed. In this way, the line wire can be utilized to its utmost capacity in speed for conveying the messages which may require a number of instruments to afterward speak or deliver them in the usual manner. Several currents may be conducted through the seleniums and so manipulated and transmitted simultaneously to different points.

Fig. 18 represents the arrangement for transmitting signals by said strips with a single long slit m in the phonograph except that the strip or negative P is fed past the slit m transversely instead of lengthwise of it as it would appear to be in the drawing. m is the narrow slit long enough to cover the length of the two selenium bars p and p', each being inclosed and protected from all light except that which passes through the slit and the negative strip P. Each bar has proper wires to conduct the current through it which are so connected up that each bar directs the current which flows in it through the line in an opposite direction, and their resistances are such that no current (or a very slight one) flows through either of them as long as they are kept in the dark. But immediately that the negative strip admits light to either bar, its resistance is lessened and the current flows through that bar to the line or to the primary coil of an inductorium which sends the induced current to line or to any other device as the case may be—the strength of the current being in proportion to the length of the bar, thereby exposed to the light. The electrical connections are, as more fully shown in Fig. 33, or they may be arranged in any other suitable or well-known manner. The longer the transparent part of the strip or signal, the more of the bar is lighted up, and the stronger the current which flows through it. When the other bar is illuminated the same effect is produced but the current is sent through the line or circuit in the opposite direction—all of which will be readily comprehended and effected by electricians.

My method and apparatus for producing pattern strips and converting the forms or signals into corresponding variations in electric currents are, therefore, peculiarly adapted for automatic telegraphy as well as automatic telephony—i. e., transmitting telephonic messages by means of such records instead of by the original sounds—which latter, I believe, is something hitherto unknown.

When similar signals are recorded on the negative by means of a shutter like the upper one in Fig. 5, they will appear on the opaque strip, as shown in Fig. 19. These strips, as well as those before described, can be read by passing them along under a properly marked scale, the direction and different distances from the central line indicating the different letters. If this strip is fed through the phonograph at the proper speed the signals will be transmitted as above described and received in the same way by my telephone or any other suitable instrument. It should be understood that my "telephone" is an instrument capable of use for every variety of telegraphing as well as telephoning and for many other purposes. Signals consisting of ciphers or arbitrary characters of any kind which may be unknown to any but the sender can be similarly recorded on the negative and transmitted by the phonograph to destination where they can be correctly received and printed either by my telephone or phonograph. And it will be observed that the most secret or complicated signals can be thus sent and received without the possibility of a mistake during transmission for the reason that the operators have nothing to do with the transmission except to keep the mechanism in order—the whole of the work being done automatically by the phonograph.

By having several operators sound their messages into the diaphragm d of the phonograph at once, but each in a different tone, the whole of them will be recorded on the negative in one composite sound wave or curve, which will then be transmitted by the phonograph as one message over the line.

As my phonograph can convert all kinds of sounds into currents as strong as are used in any of the ordinary systems of signal telegraphing, it will transmit speech as far and as certainly as the usual signals are sent and much farther than has before been practicable. And as my "telephone" can operate with currents of such strength as would be totally unsuited for the ordinary telephones and microphones, it can be connected in the circuit or at the end of the line from the phonograph in any well-known or suitable way and the combined apparatus can then transmit, relay, and send on sounds in the same way as is now done in signaling, and they can be so repeated and sent on as often and as far as ordinary telegraphic signals can be—which also is a result never before accomplished, so far as I am aware. Fig. 34 illustrates one way of embodying this arrangement. The current, after being manipulated by the pattern P and the controlling device p flows through the primary wire of the induction coil I, whose secondary wire sends a current to line. But the original current from p may, of course, be sent over the line. El El represent my telephonic apparatus used for the translating or repeating telephonic and phonographic messages or currents till the final stage, where they are reproduced as sound by the telephone T or otherwise utilized. Batteries may be inserted in the different stages, if desired. In short, by the use of my "phonograph" in connection with my "telephone" I not only raise telephony to the same level with other branches of telegraphing but I make a great advance in the whole art of telegraphy. But that is not all that they can do. By suitably attaching the expansion wires of my telephone to the diaphragm d of the phonograph instead of to its own diaphragm d, my phonograph will make negatives of the sounds or signals transmitted to it over the line in connection with the telephone. This arrangement is shown in Fig. 21 (also in Fig. 37). The telephone is designated by El, the base of which slides in the cleats t t to the position shown by the dotted lines at its ends. c c are the suspension wires running to the cross piece u which is attached to the diaphragm d which is carried by the base of the telephone and, consequently, moves with the binding posts at the other ends of the wires c c when the diaphragm and shutter are to be moved back out of the way—thus avoiding any disarrangement of the telephonic adjustments thereby. g is the armature carried by the wires with its shutter, l' is the light and r² is the current-controlling device belonging to the telephone. T is the telephone, telegraphic instrument, or other apparatus which transmits sounds, electrical impulses, or signals from a distance to the telephonic devices El by means of which those influences are enabled to actuate the phonograph and produce records or "patterns" thereof as already described. The same apparatus El can, of course, be employed for transmitting messages, etc., as well as for receiving them. The phonograph can, therefore, remain in the office and the speech, music, or signals be transmitted to it by telephone for record and preservation. All messages, either received or transmitted, whether in sounds or signals, can be thus recorded and the record be either preserved or used for repeating the messages without a possibility of error in so doing. Such a record will be as positive proof of the exact tenor of the message sent or received in any court as a photograph recording any event or scene.

A last will or testament, or a dying man's deposition, or statements, may be perfectly recorded and when needed for evidence, they can be reproduced exactly as originally spoken, and then by using a stronger light or current can be repeated as loudly as desired without altering a single tone or modulation of the words. By using a sensitive diaphragm or telephone in connection with a strong light sounds ordinarily inaudible may be clearly recorded and reproduced identical in every respect except that of being louder and this strengthening of the sounds may be carried to any extent desired, as hereinbefore fully explained.

When the phonograph is driven by an artificial motor, it is arranged with a catch or stop piece which is lifted out when any sound is to be recorded and dropped again to stop the motor and strip when done, as shown in Figs. 35 and 36, where the belt B, conveys motive force to the phonograph from any suitable driving mechanism or motor turning a pulley on the shaft of the roller A', which draws the negative strip P down over the rollers R R, as previously explained. On the same shaft as A' and moving with it is the notched wheel r, and L is a latch which is drawn down by the spring y and catches in the stop-wheel r except when prevented. As long as L is held up the negative strip P will be fed onto the roller A' by the action of the belt B; but when L drops, a pawl upon it catches into the stop wheel v and arrests the mechanism. The latch may be raised and dropped manually or automatically. The figures show an arrangement which may operate both ways. In Fig. 35 an electromagnet M' is arranged to lift the latch L whenever a current is sent through it and is in the circuit of a suitable battery and a selenium cell p² arranged at the edge of the slit m and so placed that it is normally protected from the light by the shutter s. But when the shutter vibrates, it exposes p² to the light from l; the current then flows through the circuit; and the magnet M' lifts the latch L, liberating the driving mechanism which thereupon feeds the negative strip past the slit m until the sound or other influence ceases. The latch L is then dropped by the shutter ceasing to vibrate and thereby shutting the light from p² and stopping the current through the magnet. In Fig. 36 is the arrangement which may be employed when the telephone El is connected with the phonograph. When a sound current or signal is transmitted the armature g vibrates and a light lever g' attached to it will lift the latch L and keep it out of the notches as long as the armature g continues to vibrate. Either of these arrangements may be used whereby this sound itself will release the motor and so feed the negative along as long as the sound continues, and stop it when the sound ceases. Such arrangements are in use for other purposes and any suitable one may be employed in connection with my phonograph. With this arrangement the phonograph can be used for many purposes otherwise impracticable. It can even be set up in any room or place and left by itself and will record whatever sounds or messages there are as long as the negative or motor continues unexhausted. This is also a useful arrangement for telegraphing purposes, as it continues to act while dispensing for a time with the presence of the operator.

When the expansion wires of the telephone are connected with the diaphragm d of the phonograph, as before referred to, the negative can record not only sounds but variations in the direction and strength of electric currents or in the attractive power of magnets or changes of temperature. It will also record the comparative strength of two different electric currents, showing precisely when either one became the stronger, which, and how much so. It will record changes in the intensity of light and in fine, it will record all the phenomena which the "telephone" is capable of being affected by. In turn, it can reproduce the actions of the telephone caused by those phenomena or the phenomena themselves, not only in their original strength, but amplified or strengthened without otherwise changing them.

For some purposes, it may be advisable, while making the negative, to substitute that with its slit $m$ for the selenium devices of the telephone and record the variations of the light as they are produced, as shown at P in Fig. 37. For instance, the negative could be substituted in place of the cell $r^2$ in Fig. 21, and record the variations of the light $l'$ produced by the vibrations of the armature $g$ with its shutter. This arrangement is more fully shown in Fig. 37, where the strip P is seen arranged behind the slit $m$ and exposed to the light from $l'$, which is varied by the shutter $s'$. This will ordinarily be the best way for strengthening light pulsations. As the vibrations of the shutter on the armature $g$ are much more ample than those of the shutter on the diaphragm $d$ under the action of the same sound, current or other influence. One way of doing this is illustrated in Fig. 37, where the light from $l$ varied by the shutter on $d$ is thrown on the selenium cell $p$, and the current thus produced is let through the thermal wires $c$ $c$ of the telephone, causing a considerable increase in the vibration of the armature $g$ with its shutter $s'$. This produces more marked variations in the light from $l'$ which, thus strengthened or amplified, are then recorded on the negative strip P.

There are very many other uses for which my apparatus may be employed, but it is unnecessary to enumerate them, as the directions herein given will enable those versed in photography, electricity, and acoustics, to practise any of them.

It will, of course, be understood that I do not confine myself to the precise details of the construction or arrangement of my apparatus as herein set forth, for there are many ways in which they may be modified without changing or departing from the principles of my invention. I am aware that it is not new to produce photographic impressions of telegraphic messages arriving over a line, such impressions not being capable of reproducing said messages again. Such a process is merely one way of printing the telegraphic messages received, but such prints are of no value for the purposes of my process because they are not capable of use in the process as "patterns." My invention or process has not for one of its objects to merely print the telegraphic messages received, but the production by means of electrical impulses of "patterns" or devices which are adapted to reproduce such impulses whenever desired. I, therefore, do not claim a process for printing telegraphic messages by photography, which has for its object and result the production of prints that have no function, use, or value, except as copies of the messages received and so printed as aforesaid.

Fig. 38 shows the general arrangement of the apparatus in more detail than Fig. 10. When in use the works are shut in by tight doors, as in Fig. 45, where O is the mouth piece through which vocal or other sounds are thrown on the diaphragm D. This mouth piece may be a deep bell-shaped cavity directly over the diaphragm or be fitted to the face and be connected by a tube ending over the diaphragm. The effect is much increased by having the mouth piece fit closely to the face of the speaker. E$l$ represents an electrical apparatus capable of vibrating the diaphragm D when a telephonic, telegraphic or other suitable current is passed through it and thereby vibrating the shutter $s$ placed in the path of the beam of radiant rays from $l$ here shown as an electric lamp, and thus varying said beam in accordance with the extent and character of its own movements. The beam thus varied is in the first instance thrown upon the sensitized strip P fed down from reel A over guide roller R before the opening or slit $m$ on to another reel A$'$. The strip having been properly treated to bring out and fix the image thus obtained and render it suitable for use as a pattern, as before described, it is again wound upon reel A and its end hooked to reel A$'$. The apparatus E$l$ is moved back far enough to take shutter $s$ out of the beam of radiant rays which then pass through the negative and are varied thereby as they had been previously varied by the shutter $s$, after which they fall upon a selenium cell or other suitable apparatus $p'$, all as heretofore explained.

Fig. 39 is a horizontal section through the lines $x$—$x$ of Fig. 38, showing the light and lenses $l$, alum cell 2, shutter $s$, cylindrical lens $p$ which converges the light laterally to a long narrow streak where it passes through the opening $m$ to strip P. The set-screws $t'$ $t'$ adjust the forward position of the block $t^2$ on apparatus E$l$ to bring the shutter $s$ to the right point. $p^2$ is a small selenium cell which serves to automatically start off the strip P when the phenomenon occurs which is to be recorded. The shutter $s$ is caused to vibrate, as already stated, and thereby uncovers the cell $p^2$, allowing the light which had previously been stopped by the shutter to fall upon the cell and by increasing its conductivity an electric impulse is sent through the starting magnet M$'$.

This immediately pulls up the armature and lever L and raises the pawl which had previously held the reel A', whereupon the reel is suddenly revolved and draws the strip P past opening m until the sound or other phenomena ceases, when the shutter becomes still, the current substantially ceases to flow through the cell $p^2$ and magnet M', the lever L drops and the reel A' is stopped. When reproducing the recorded phenomena the lever L is lifted manually by a cord a running over a pulley through an aperture to the outside at some accessible point, where it can be pulled when desired. The current of the cell $p^2$ can also be sent through induction coil I and transmit the message if desired to a telephone T at the same time that it is being recorded on P.

The shutter may be attached directly to the center of the diaphragm, or at the end of a light lever, as in Figs. 38 and 44, pivoted in a bar or support b. The diaphragm being connected to the short arm of the lever a greatly increased motion of the shutter is obtained.

Fig. 40 is a more complete view of the arrangement heretofore shown in Figs. 14, 15, 21, 22, 23 and 34. The slide S, Fig. 38, having a single slit m, is removed and in its place is put slide $S^2$, having three slits, as in Fig. 42. The slide S is represented by slide S' in Fig. 41, having a base 16, upon which slides another piece 17, carrying the plano-cylindrical lens p adjustable to bring its focus at or near the opening m. Slide $S^2$ has three slits adjustable upon it, as in Fig. 23, with three cylindrical lenses p attached to an arc 18 upon which they may be adjusted laterally to bring their foci in or near m, m', $m^2$, and the whole series are adjustable on the slide 17, as before described. The light from each lens goes to its own selenium cell p', which are adjustable in position in the manner already set forth on a base plate 16, Fig. 43, which is screwed in place in the apparatus, and each cell has its electrical connections suitably arranged, as fully hereinbefore specified so that further explanation of Fig. 40 is needless except that when the single cell p', Fig. 38, is to be used the middle cell p', Fig. 43, is simply swung out of the way by turning it down on its screw, which allows the light to pass properly.

Fig. 44 shows the connection of apparatus El with its shutter s, diaphragm D, armature g, magnet G, and wires c to the body and base of the main apparatus t t being the ways by which El slides back and forth as before stated.

Fig. 46 shows the mode of connecting up for recording the incoming message (or the like) at P and at the same time listening to it or receiving it at T by any telephone, telegraphic, or other suitable apparatus and also repeating or transmitting it further on to another station or apparatus El and another T. This is done by means of the selenium cell $p^3$ which is more or less exposed to light by the motion of the armature g of El, as it is vibrated by the current flowing through the magnet G. This may be done either by the shutter attached to the armature and cutting off more or less of the light thrown across it to the cell or by a mirror which reflects more or less of its light upon $p^3$ according to its vibration. Both are shown in the model having their own selenium cells. The current of one of these can be sent through the magnet G to reinforce a line current coming in at the binding posts at L while the current of the other cell $p^3$ can be sent farther on as before stated or can be sent to the induction coil I, whose secondary current is transmitted on as delineated in the drawing. Fig. 47 shows the current of this selenium cell employed to operate a starting magnet M' in place of the cell $p^2$ in Fig. 38. When the lever L is lifted it hits a contact point above and completes the circuit $L^3$ through the lever. This current runs to a small electric motor EM, Figs. 38 and 48, which by a belt B working on pulley R' revolves the reel A' and feeds the strip or pattern P. A crank handle is provided for manually turning the pulley R', winding a cord and lifting a weight (or winding a spring) for running the reel when an electro-motor can not conveniently be used. When using the latter the arbor for the cord is disconnected by unscrewing the set-screw which holds it on the shaft.

Fig. 48 shows the arrangement for running reel A'. 9 is a steel shaft running in bearings as U U. When the pulley R' is turned to lift the weight, the pawl z catches in the ratchet wheel w' and holds the winding as usual. The pawl z is fastened to another ratchet wheel w, whose teeth face in the opposite direction to those of w', and which are held by a pawl z' fastened to any stationary support shown in the drawing, as the back of the box or apparatus.

The disk v seen in Figs. 35, 38 and 47 is connected to wheels w by springs shown as held between posts projecting from the adjacent faces of v and w respectively. Any convenient number of springs may be so applied as to give the desired strength. When the lever L with its pawl suddenly stops the motion of disk v, the weight continues to pull the wheel w around until the springs between it and v bring w to a standstill. w being prevented from receding any by the pawl z', the springs remain under tension (or compression, as the case may be) until the lever L is lifted again out of the notch of v, which is thereupon suddenly forced forward by the recoil of the springs. This secures that the reel A' and strip P shall have a rapid motion given to them at the outset instead of beginning slowly and gradually acquiring the proper speed as would occur without this device.

The reel A' fits upon a square formed on the sleeve 10 and, therefore, moves with it. The strip P wound around the reel is protected from the light by the light-tight case or box 11, having a cover 12 held on by springs 13. This box turns loosely on the reel and takes any position agreeable to the strip P while feeding off it through an opening through its side, as seen in Fig. 50. 14 is a catch to hold the reel upon the sleeve 10, but allowing it to be readily removed when desired.

Substantially the same description applies to the reel A in Figs. 49 and 51. 14 is a snap spring to hold it on sleeve 10, which is held on shaft 9 in any convenient way shown as by a pin through 9. The spring 1 bearing on a collar of 10 acts as a friction brake on reel A. Shaft 9 is fixed in any convenient way, shown as bolted to the box or case of the apparatus.

It will be observed that by this invention a recording medium is transmitted to the surface adapted to receive the record and that this medium is merely controlled by the speaking diaphragm as it passes to the surface and thus the diaphragm is not called upon to do the physical work of making the record. The light projected on the surface makes the record and is simply controlled in character or position as it passes.

Having thus fully described my invention what I now claim as new and desire to secure by Letters Patent is:

1. In the within described system, the device or combination of elements for recording and reproducing pulsations or variations in radiant energy, consisting in the combination of a suitable surface having those variations consecutively recorded upon it and adapted for producing similar variations in a beam of light; an electric receiver sensitive to light having such varying beam of light thrown upon it and thereby producing similar variations in an electric current having any desired strength; and an electrical receiver actuated by said current and producing similar variations in radiant energy.

2. In the within system, a device or combination for amplifying or enlarging the effective action of sound wave in the direction of its width or intensity without changing its proportional length, consisting in the combination of a source of light; means operated by and in accordance with sound waves for varying the light; and a uniformly moving sensitive surface; the speed of said surface and the relative distances between said three elements being variable to suit the requirements of the case.

3. In the within system, a device or combination for reinforcing the sounds produced in the original or central sound-producing instrument, at such stages or distances as the sounds can be heard plainly, consisting in the combination of the central sound-producing instrument; suitable secondary sound-producing apparatus at each such stage; electrical connections from each apparatus to the original instrument; apparatus producing currents similarly varied and sent to each secondary apparatus; and means for so adjusting the transmission of the several currents that the like variations occur at such intervals one after the other, as correspond to the time required for the sounds to pass from each station to the next one in order.

4. In the within system including a reproducing instrument, a device or combination for automatically regulating and controlling an electrical current flowing through the reproducing instrument, consisting in a suitable electric generator, a conductor whose resistance can be varied by means of the record or pattern included in the circuit of the instrument; a source of radiant energy capable of affecting the resistance of said conductor; a pattern having upon it curves or forms representing the pulsations or variations it is desired to make in the current arranged to properly control said radiant energy; and means for moving the pattern at such speed as will produce the desired variations in the resistance of said variable conductor and, consequently, in the current flowing through it and through the circuit.

5. In the within system, a device or combination for automatically varying the intensity and direction of a current flowing through a circuit, consisting in said circuit having two branches; an electrical conductor in each branch whose resistance is varied by light; electrical connections between them and said circuit such that the current that flows through one will be in the opposite direction to that which flows through the other, and each will have a strength proportionate to the resistance in its circuit at each instant; means for supplying a suitable beam of light for said conductors; means for properly varying said beam of light while falling on said conductors, and thereby so varying their resistances as to allow the current to predominate and have the strength in either of them, as may be desired.

6. In the within system, a device or combination including a pattern for producing in an electrical current pulsations or variations corresponding to those formed on the record or pattern, consisting in a source of radiant energy arranged to throw a steady beam of its rays upon a conductor whose electrical resistance is varied by the action of said rays; said record or pattern interposed in the path of said beam and arranged to be moved uniformly before said beam and to vary the amount of said rays which shall reach said conductor in accordance with the forms or curves exposed to said beam; a suitable perforated screen limiting said beam to a cross-section whose length is equal to the maximum width of said pattern or record, and whose lateral width is very small, so as to expose but a minute portion of the length of said record or pattern to said rays at any particular instant; a suitable electrical circuit containing said variable conductor so that variations in its resistance produce similar variations in the current flowing through said circuit; means for moving said record or pattern at the proper speed whereby it varies the length of said beam which shall reach said variable conductor in proportion to the width of said record or pattern which is exposed to said beam at each successive instant and thereby correspondingly varies the resistance of said conductor and the strength of the current flowing through it.

7. In the within system, a combination or device which, in the process of forming a record of pulsations in or variations in light, sound, electric currents, and magnetism, amplifies the record in width without changing the length or duration of the waves, consisting of a source of light and a shutter constituting means for recording said variations; and means for varying the position of the light with respect to the shutter for producing a leverage or multiplication of the movement which corresponds to the intensity of said variations; whereby a correspondingly increased width or surface of the sensitive material is acted upon in making the record and a suitable sensitive surface adapted for forming said record.

8. In the within system, the combination of a device for reproducing the variations or pulsations in sound, light, electric currents, or magnetism, recorded on the pattern; said pattern, suitable reproducing apparatus; apparatus producing a suitable active agent for governing the action of the reproducing apparatus according to the intensity thereof acting upon it; said pattern arranged to vary the intensity of said active agent according to the form of the portion exposed to it; means for uniformly moving said record or pattern along at the proper speed and successively exposing the different portions to said active agent; whereby the intensity of said active agent is varied in proportion to the width of the wave at each instant of time exposed to it; thereby properly varying the action of the reproducing apparatus.

9. In the within system, a combination or device for recording variations or pulsations in radiant energy consisting of a screen provided with a narrow slit or opening through which a beam may pass, apparatus furnishing said suitable beam of light, a sensitive surface arranged to receive said beam, means for moving said surface along before said slit; a light-varying device interposed in the path of said beam, actuated by the radiant energy which is to be recorded, in accordance with the pulsations or variations therein, and arranged to vibrate in the proper direction as described relatively to the motion of the sensitive surface; whereby an image or record is produced on said surface having variations corresponding to the variations of intensity and duration in the phenomenon being recorded and capable of reproducing said phenomenon.

10. In the within system, a combination or device for reproducing sound, in a different tone, note, or pitch, consisting of a photographically-obtained negative or record of said sound; suitable sound-producing apparatus controlled by said record; and means for moving said record more rapidly or less rapidly than while the record was being produced according as the pitch is to be higher or lower than that of the original sound.

11. The combination of a source of light, a uniformly moving surface sensitive to light; and a shutter moved by or in accordance with sound waves or pulsations and arranged and operating to admit said light to or cut it off from said surface in accordance with said sound pulsations or variations and thereby produce a record capable of reproducing said sound waves or pulsations, substantially as described.

12. The combination of a source of light adapted to cast a beam; a diaphragm adapted to be vibrated by or in accordance with variations or pulsations in radiant energy, a shutter moved by the diaphragm in its vibrations and arranged to interrupt or modify the said beam of light in accordance therewith; a surface sensitive to light and means for moving said surface along under exposure to said varying light beam to form a record capable of reproducing said pulsations or variations.

13. The combination of photographically produced negative or pattern having upon it forms or curves representing variations or pulsations in sound, light, or electric currents and arranged to vary the resistance of an electrical conductor in accordance with the curves or forms upon it; an electrical conductor adapted for being so acted upon and controlled by the pattern; and suitable driving mechanism for properly moving the pattern along.

14. The combination of a source of light furnishing an elongated beam; means for varying the amount transmitted by said beam in accordance with the pulsations or variations in the sound, light, electric current, or magnetic attraction which are to be recorded; a surface sensitive to light; and mechanism for moving said surface along in the path of said beam to form a record capable of reproducing said pulsations or variations.

15. The combination of a source of light furnishing an elongated beam; a pattern having variations in light recorded thereon such as herein described arranged to vary said beam in accordance with the variations in said pattern; mechanism for moving said pattern in the path of said beam; and an electrical conductor whose resistance is varied by light, arranged to receive said varying beam of light and to correspondingly vary an electric current flowing through it.

16. The combination of a source of light adapted to furnish an elongated beam; a pattern having forms thereon corresponding to variations in light movable across the path of said beam and arranged to vary said beam in accordance with the variations in the forms upon it; means for moving said pattern and an electrical conductor sensitive to light exposed to said varying beam.

17. The combination of a source of light furnishing a steady beam of light; a moving pattern accurately representing sound waves arranged to vary said beam in accordance with the forms upon it; and translating devices actuated by and in accordance with said varying beam of light.

18. In apparatus for recording and reproducing sound through the medium of light, a movable record blank sensitive to light, means for projecting light varied in accordance with the pulsations or variations in sound upon said blank to form a record, means for rendering said record translucent in degrees corresponding to said pulsations or variations, means for reproducing sound and means for projecting light through the record thus produced to reproduce the sound.

19. The combination of a source of radiant energy; means for properly directing the rays therefrom; a moving pattern in the path of said rays having upon it curves or forms representing variations or pulsations in sounds, light, or electrical currents and constructed and arranged to properly vary the said rays; a stationary screen or device having one or more apertures or slits in it for stopping all of the said rays except those which pass through said slit or slits; an electrical conductor whose resistance is varied by said radiant energy, arranged to be acted upon by the rays passing through said slit or slits after being varied by the pattern; and an electrical receiver actuated or controlled by the currents flowing through said conductor; substantially as set forth.

20. The combination of a source of light; a moving pattern or form representing variations or pulsations in sound, electric currents, or magnetic attraction; a slitted screen or partition for directing said light upon said pattern; a body sensitive to light exposed to said varying beam and a suitable camera or casing inclosing the whole.

21. The combination of a source of radiant energy, means for directing rays therefrom; a photographically-produced pattern for properly interrupting or acting upon said rays in accordance with the photographed curves upon it; and a suitable device or body sensitive to the action of said radiant force constructed in elongated form and adapted to be acted upon more or less energetically in proportion to the length of it which is exposed thereto by the interrupting device, substantially as set forth.

22. The combination of a source of radiant energy, a body sensitive to the action of said radiant energy, constructed in an elongated form and adapted to be acted upon more or less energetically according to the length of it which is exposed to said radiant force; a movable device consisting of a record due to the action of sound waves arranged between them and adapted to vary the action of the radiant force upon the sensitive body by varying the length of said body which is exposed thereto; and means for properly moving said movable device in accordance with the variations or pulsations of sound, substantially as set forth.

23. The combination of a source of radiant energy; means for directing the rays therefrom; a moving pattern in the path of said rays and adapted for properly manipulating the same, the said pattern consisting of a record in properly timed sequence of changing phenomena; a stationary screen or partition having two or more apertures or slits through it for allowing the passage of rays manipulated by different portions of the pattern at the same time; and suitable stationary devices sensitive to said radiant energy arranged opposite the openings or slits and adapted to be successively acted upon by rays manipulated by a given portion of the pattern and coming through the different slits one after the other as the said portion of the pattern moves past the successive slits.

24. The combination of a source of light; a pattern moved uniformly in the path of said light, the said pattern consisting of a record in properly timed sequence of changing phenomena; a stationary screen provided with a series of slits or openings for taking light from a given portion of the illuminated pattern at different times, and means for adjusting the intervals of time between them by varying the distances between the respective slits.

25. The combination of a source of radiant energy and an electric circuit; a conductor in such circuit capable of being affected by said radiant energy to vary its resistance; and a photographically produced negative or pattern having upon it a record adapted to vary the radiant energy reaching said conductor for producing corresponding changes in the resistance of said conductor; for automatically regulating, controlling and varying the current flowing through the conductor according to the forms on the pattern.

26. The combination of a source of radiant energy and an electric circuit; an electrical conducting device in said circuit adapted to send through the circuit a current which varies in intensity and polarity in accordance with the variations in the curves or forms upon the pattern which controls its action; a photographically produced negative or pattern having upon it forms or curves representing sound waves or electrical impulses automatically recorded by the sounds or impulses themselves and adapted for reproducing the same again, the said pattern being moved between said source of radiant energy and conducting device to control the energy reaching the conducting device to cause it to send through the circuit an undulating or alternating current corresponding to the curves or forms upon the pattern and, consequently, corresponding to the variations or pulsations in the phenomena recorded upon the pattern, substantially as set forth.

27. In an apparatus for recording and reproducing sounds, electrical impulses and analogous phenomena, a stationary opaque partition or screen, having two or more openings or slits, and arranged to stop all of the radiant rays except those which pass through said slits, provided with means for varying the relative distances of the said openings or slits from each other, and apparatus for properly directing a beam of light through each of said openings at the same time, a record or pattern in properly timed sequence of said phenomena moving before said openings, and a separate means before each of said openings or slits for utilizing said phenomena, all combined and operating substantially as set forth.

28. In the within system, a combination or device for recording sounds, electrical impulses and analogous phenomena, consisting of suitable recording apparatus actuated by the phenomena themselves, and arranged to automatically record them upon a sensitive surface; said sensitive surface; an elongated photographically obtained image or form so thrown upon said surface in which the width of said image shall correspond to the varying intensity of the pulsations or variations in said phenomena and the form of the curved outlines thereof shall correspond to the character and direction of said variations or pulsations at each instant of time; the sensitive surface when acted upon by said image being afterward treated to impart to it actinic or other properties different from the remainder of the surface, whereby it is adapted for reproducing the phenomena so recorded thereby.

29. In the within system, a device or combination for recording sounds, electrical impulses and analogous phenomena, consisting of suitable devices and means controlled by the phenomenon which is to be recorded and producing upon a sensitive surface a characteristic change, which renders the part so acted upon different from the rest of said surface and which corresponds in intensity, extent, or character with the intensity and character of the phenomenon or influence which produced the same; said sensitive surface; means for confining or limiting the said action of said phenomena to a definite area or section of said sensitive surface, which area may be of any suitable length, but of comparatively very limited breadth; means for moving said surface uniformly along in the direction of the breadth of said section of its surface and thereby bringing different portions of said sensitive surface successively under the influence of said phenomenon in the form of a strip having a width equal to the length of said section and of any convenient length; said surface being afterward treated, thereby producing upon the negative or pattern an image or form corresponding to the variations or pulsations of the phenomenon which produced it, and characterized by photographic properties, which adapt it for reproducing the same or similar pulsations or variations in light, sound, electrical currents and analogous phenomena, substantially as herein set forth.

30. In apparatus for recording and reproducing sound through the medium of light, a movable record blank sensitive to light, means for projecting light varied in accordance with pulsations or variations in sound upon said blank to form a record and means for utilizing the record thus produced to reproduce the sound.

31. In the within system a source of light arranged to cast a beam, a record blank sensitive to light, means for moving said blank along in the path of said beam, means controlled by sound waves or pulsations to vary the amount of said beam admitted to said blank to form a record capable of reproducing the sound, and means for relatively arranging said elements to intensify the recording effect.

32. In an apparatus for reproducing sound, a record having photographically produced thereon forms representing the pulsations or variations it is desired to reproduce, a circuit including a reproducer and a conductor whose resistance may be varied by light, means for moving said record along in proximity to said conductor, and means for projecting light through said record upon said conductor.

33. A record of pulsations in sound consisting of a thin sheet rendered translucent in degrees corresponding to said pulsations photographically-produced thereon and capable of reproducing the sound.

34. A record of pulsations in sound consisting of a strip or band photographically affected in accordance with said pulsations and capable of reproducing the sound.

35. In apparatus for recording and reproducing pulsations or variations in sound, a source of radiant energy, a movable record blank in proximity thereto sensitive to and capable of being affected by said energy for receiving and retaining a record of said energy, means for moving said record blank along, means for varying the amount of said energy admitted to said blank and thereby producing a characteristic change in said blank in accordance with said pulsations or variations to form a record and means for utilizing said record to reproduce the sound.

36. In apparatus for recording and reproducing pulsations or variations in sound, a movable strip or band sensitive to radiant energy, means for forming thereon a record of said pulsations or variations by the direct action of said radiant energy, reproducing means capable of being affected in accordance with said record and reproducing the sound, and means for moving said strip or band along in operative relation to said reproducing means.

37. The combination with a source of radiant energy, of a movable record blank operatively related thereto capable of being affected by said radiant energy, means for moving said record blank and means for varying the amount of said energy supplied to said record blank in accordance with pulsations or variations in sound to produce a characteristic change in said record blank and thereby form a record capable of reproducing the sound.

38. In apparatus for reproducing sound, a record having photographically produced thereon a representation of the pulsations or variations it is desired to reproduce, a circuit including a source of current a telephone and a selenium cell, means for suitably moving said record in operative proximity to said selenium cell and means for projecting light through said record upon said cell.

39. The combination of a translucent photographically produced record of succeeding variations in radiant energy, a circuit including a source of current, a reproducer, and a selenium cell, means for suitably moving said record and means for projecting light through said record upon said selenium cell.

40. In instruments of the class described, in combination, a photo-electric cell included in a telephone-circuit, a moving photographic sound-record, and means for passing light through said record to the cell, substantially as set forth.

41. The method of recording and reproducing sounds consisting in forming a photographic record of the sounds by directing actinic rays emanating from a source thereof upon a photo-sensitive surface and varying the said rays reaching said surface by and in accordance with the sound waves, then developing the photo-sensitive surface, then interposing the sound record so produced in the path of a constant beam of light, setting up in an electric circuit electric variations by and in accordance with the variations of the transmitted light-beam, and producing by said electric variations air vibrations corresponding to the original sound.

42. The method of recording sounds consisting in forming a photographic record of the sounds by directing actinic rays emanating from a source thereof upon a photo-sensitive surface and varying the amount of said emanations by and in accordance with the sound waves.

43. The method of recording sounds consisting in setting up in a charged electric circuit variations corresponding to the sound waves, controlling actinic radiations by and in accordance with said electric variations, and directing said actinic radiations upon a photo-sensitive surface.

44. In a device of the class described the combination with a photo-sensitive surface and a source of actinic rays movable relative one to the other, and means for controlling the said rays reaching said surface by and in accordance with sound waves.

45. In a device of the class described the combination with a source of light rays, of a photo-sensitive surface, means for moving said surface across said light rays, and means for controlling the amount of said rays reaching said surface by and in accordance with sound waves.

46. In a device of the class described the combination with a source of light rays, of a photo-sensitive surface, means for moving said surface across said light rays, and means for controlling the width of the beam of rays transversely of the moving surface by and in accordance with sound waves whereby a record varying in width will be produced.

47. A sound record consisting of a record blank photographically affected in accordance with sound pulsations and capable of reproducing the sound.

48. The method of producing phonographic records capable of reproducing sound consisting in first obtaining a photographic pattern or negative representing pulsations in sound and then producing commercial copies from said negative.

49. A pattern or negative having photographically recorded thereon pulsations in sound and capable of use as a master record in producing therefrom commercial copies capable of reproducing the original pulsations in sound.

50. The combination with an electric circuit, of means for telephonically transmitting sounds thereon, a movable receiving surface, means for recording thereon the transmitted sounds, and means for automatically moving said surface to receive the record, the said movement being controlled by the telephonic transmitting means.

51. The combination with an electric circuit, of means for telephonically transmitting sounds thereon, a distant movable receiving surface, means for moving said surface, means for recording on the moving surface the transmitted sounds, and means accessible at the transmitting point for controlling the movement of the receiving surface.

52. The combination with an electric circuit, of means for telephonically transmitting sounds thereon, a distant movable receiving surface, means tending to move said surface, a stop normally preventing movement of said surface, means accessible at the transmitting point for controlling said stop to permit the movement of said surface, and means for recording on the moving surface the transmitted sounds.

53. In a system of the class described the combination with an electric circuit, of means for transmitting to a distant point in said circuit telephonic messages, a second electric circuit at said distant point, means for receiving the sound pulsations in said first circuit at said distant point and for making a record thereof, and means operated by said record for impressing said pulsations on said second circuit whereby the message will be relayed, and means for reproducing as sound the relayed message.

54. The combination with an electric circuit, of a selenium cell therein, a movable sending blank having a record of visible forms thereon, means for transmitting a beam of light modified by said record to said selenium cell to modify the electric pulsations in said circuit, means for moving said record to bring successive portions thereof under the influence of said beam, a receiving blank, means for moving said receiving blank, and means controlled by the pulsations in said circuit for reproducing on said receiving blank the record of visible forms on said sending blank.

55. The combination with an electric circuit, of a selenium cell therein, a record surface different portions of which affect light differently, means for directing a beam of light from one point on said surface to said selenium cell the said beam being modified by said record, means for moving said record surface to bring successive portions under the influence of said beam directed to said selenium cell whereby varying pulsations or undulations will be set up in said circuit, a receiving surface, means for moving said surface, and means controlled by the pulsations in said circuit for reproducing on said receiving surface the original record.

56. The combination with an electric circuit, of a selenium cell therein, a record of visible forms, means for transmitting a beam of light from one point on said record to said cell, means for exposing different portions of said record to said beam to produce varying pulsations or undulations in said circuit, a receiving surface, and means controlled by said pulsations for reproducing on said receiving surface said record of visible forms.

57. The combination with an electric circuit, of means therein which react to light, a sending surface having recorded thereon variations in light, means for transmitting a beam of light from one point on said record to said light reacting means, means for exposing different portions of said record to said beam to produce varying pulsations or undulations in said circuit, a receiving surface, and means controlled by said pulsations for reproducing on said receiving surface said record of variations in light.

58. The combination with an electric circuit, of means therein which react to light, a sending surface having recorded thereon variations in light, means for transmitting a beam of light from one point on said record to said light reacting means, means for exposing different portions of said record to said beam to produce varying pulsations or undulations in said circuit, a receiving surface, and means controlled by said pulsations for photographically reproducing on said receiving surface said record of variations in light.

59. The combination with means for transmitting electric pulsations, of means connected therewith which react to light, a surface having a record of visible forms thereon, means for transmitting light varied by said record to said light reacting means producing pulsations therein, a receiving surface, and means controlled by said pulsations for reproducing on said receiving surface said record of visible forms.

60. In a device for reproducing variations in light and sound the combination with a movable record, of a receiving surface, means operated by said record for projecting upon said receiving surface in rapid succession a series of photographic impressions, and separate means operated by said record for reproducing sound recorded in regular order thereon.

61. The combination with a record having thereon visible representations of variations in light in sequence, of a source of light, a receiving surface, means for moving said record and for exposing said visible representations to said light in regular order and for transmitting said light varied by said visible representations to said receiving surface, and separate means operated by said record for reproducing sound recorded thereon in regular order.

62. In a device of the class described the combination with a speaking diaphragm, of a movable photo-sensitive record blank, a source of light, and means controlled by said diaphragm for throwing a beam of light on said record blank.

63. In a device of the class described, the combination with a speaking diaphragm, of a movable photo-sensitive record blank, a source of light, and a reflecting surface controlled by said diaphragm for throwing a beam from said source of light on said record blank.

64. In a device of the class described, the combination with a speaking diaphragm, of a movable photo-sensitive record blank, a source of light, and a reflecting surface carried by and partaking of the movements of said diaphragm for throwing a beam from said source of light on said record blank.

65. In a device of the class described the combination with a speaking diaphragm, of a movable photo-sensitive record blank, means for concentrating a beam of light on said blank, and means operated by said diaphragm for controlling said beam of light.

66. In a device of the class described the combination with a speaking diaphragm, of a movable photo-sensitive record blank, a source of light, a reflector for directing rays from said source of light to said blank, and means operated by said diaphragm for controlling said beam.

67. In a device of the class described the combination with a speaking diaphragm, of a movable photo-sensitive record blank, means for directing a beam of light toward said blank, means operated by said diaphragm for controlling and modifying said beam, and a lens for concentrating said modified beam upon said blank.

68. The method of making sound records which consists in exposing a moving light sensitive record surface to a beam of light controlled in accordance with sound pulsations whereby a photographic line will be produced developing and fixing said line and treating said record to intensify said photographic effect.

69. The method of making sound producing records which consists in photographically recording sound pulsations on a surface and so treating said surface as to make the record more pronounced and permanent.

70. In a device of the class described the combination with a movable record having a succession of photographic impressions thereon, means for directing light rays to a point across which said photographic impressions pass and for projecting the rays modified by said record to a receiving surface, and means for reproducing said photographic impressions at a distance comprising an electric circuit including means which react to light exposed to rays modified by said photographic impressions on said record.

71. In a device of the class described the combination with a movable record having a succession of photographic impressions thereon, means for directing light rays to a point across which said photographic impressions pass and for projecting the rays modified by said record to a receiving surface, and means for reproducing said photographic impressions at a distance comprising an electric circuit including a selenium cell exposed to rays modified by said photographic impressions on said record.

72. In a device of the class described the combination with a movable record having a succession of photographic impressions thereon, an electric circuit having therein means which react to light, means for directing light rays from said photographic impressions to said light reacting means, and means controlled by the current in said circuit for reproducing said photographic impressions at a distance.

73. In a device of the class described the combination with a movable record having a succession of photographic impressions thereon, an electric circuit having therein a selenium cell, means for directing light rays from said photographic impressions to said selenium cell, and means controlled by the current in said circuit for reproducing said photographic impressions at a distance.

74. In an apparatus for transmitting vocal and other sounds, the combination with means for making a record of the sound vibration, of an electric circuit, means operated by said record for producing in said circuit similar electrical vibrations of greater rate, means for transforming said electrical vibrations into mechanical vibrations, means for recording said mechanical vibrations on a phonogram blank, and means for reproducing the original sound from said phonogram.

75. The combination with means for producing a record of sound waves, an electric circuit, means controlled by said record for transmitting electrical waves, impulses or undulations of current in said circuit corresponding to said sound waves in amplitude but having a different rate of vibration or pitch, and means for recording said waves at the receiving end of the circuit.

76. In an apparatus for reproducing sounds at a distance, the combination with means for making a record of sound, an electric circuit including a controller, means controlled by said record for operating said controller to set up electric waves or undulations of current corresponding in character to the sound waves but having a different period, means operated by said transmitted waves for producing a record of said waves, and means operated by said last mentioned record for producing audible sound.

77. The combination with a speaking diaphragm, of a movable record surface, and means for recording on said surface the movements of different parts of said diaphragm under the influence of sound pulsations.

78. The combination with a speaking diaphragm, of a movable record surface and a series of elements separately connected to and partaking of the movements of said diaphragm at different points across it for recording said movements on said record.

79. In instruments of the class described, in combination, means which react to light included in a telephone circuit, a movable visible sound-record, and means for passing light modified by and in accordance with said visible record to the said light reacting means substantially as set forth.

80. A photographically produced sound record capable of reproducing the sound recorded thereon.

81. A sound record consisting of a photographically produced pattern of sound characterized by a difference in elevation from adjacent portions of the record surface.

82. A record of sound made from a photographically produced record of sound and capable of reproducing the sound.

83. A sound record consisting of a photographically produced pattern of sound waves and capable of reproducing the sound.

84. The method of making a sound record which consists in photographically affecting a sensitive surface in accordance with sound waves.

85. The method of making a sound record which consists in photographically affecting a sensitive surface in accordance with sound waves and then producing by the use of said photographically produced record commercial sound records capable of reproducing the sound.

86. The method of producing commercial sound records which consists in photographically recording sound waves embossing said record and making commercial records capable of reproducing the sound from said embossed record as a master record.

87. The method of making sound producing records which consists in photographically recording sound pulsations on a surface and so treating said surface as to make the record more pronounced and permanent and then producing by the use of said photographically produced record commercial sound records capable of reproducing the sound.

88. The method of making sound records which consists in exposing a moving light sensitive record surface to a beam of light controlled in accordance with sound pulsations whereby a photographic line will be produced developing and fixing said line and treating said record to intensify said photographic effect and then producing by the use of said photographically produced record commercial sound records capable of reproducing the sound.

89. An apparatus for transmitting to a distance by telegraphic or telephonic methods a record of variations in light comprising means at the sending station which react to light to cause electrical variations corresponding to the variations in light, means at the receiving station for translating said electrical variations into corresponding variations in light intensity, and means for recording said last mentioned variations.

90. Means for electrically transmitting graphic messages including a message sheet of varying degree of transparency a source of light, means for projecting the light from said source of light through the portions of said message sheet successively, means which react to light upon which the rays of light are projected after passing through said message sheet, an electrical circuit including said light reacting means, means for transmitting the various undulations in the intensity of the current in said circuit caused by the action of the light rays upon the light reacting means to a receiving station, and a reproducing instrument including means for translating the varying undulations of said current into a visible reproduction of the transmitting message.

91. Means for electrically transmitting graphic messages including a visible record, a source of light, means which react to light, means for projecting upon said light reacting means rays from said source of light modified by and in accordance with successive portions of said record, an electrical circuit including said light reacting means, means for transmitting the various undulations in the intensity of the current in said circuit caused by the action of the light rays upon the light reacting means to a receiving station, and reproducing means for translating the varying undulations of said current into a visible reproduction of the transmitting record.

92. The combination with an electric circuit, of means therein which react to light to cause pulsations in said circuit corresponding to the variations in light reaching said means, light controlling means including a shutter, and means operated by the pulsations in said circuit for controlling the movements of said shutter.

93. The combination with a source of light, of a movable record of variations in light adapted to modify the light transmitted from said source, an electric circuit, means therein which react to light exposed to the action of said modified light to cause pulsations in said circuit corresponding to said variations, light controlling means, and means operated by the pulsations in said circuit for operating said light controlling means in accordance with the modifications of light by said record.

94. Means for recording and reproducing sound waves comprising a movable sensitized surface, means for moving said surface, an inclosure therefor, two shutters having coöperating light openings for controlling light reaching said surface, and means for moving one of said shutters by and in accordance with sound pulsations.

95. Means for recording and reproducing sound waves comprising a casing, a movable sensitized surface therein, means for moving said surface, a shutter for controlling the admission of light to said surface in said casing, and means for vibrating said shutter by and in accordance with sound waves.

96. Means for recording and reproducing sound waves comprising a casing, a movable sensitized surface therein, means for moving said surface, means for producing a constant light, a shutter for controlling the admission of said light to said surface in said casing, and means for vibrating said shutter by and in accordance with sound waves.

CHARLES EDGAR FRITTS.

In presence of—
C. L. WILBUR,
R. GERRELL.

It is hereby certified that in Letters Patent No. 1,203,190, granted October 31, 1916, upon the application of Charles Edgar Fritts, of New York, N. Y., for an improvement in "Recording and Reproduction of Pulsations or Variations in Sounds and other Phenomena," an error appears in the printed specification requiring correction as follows: Page 23, lines 4–5, claim 48, for the word "phonographic," read *sound;* and that the said Letters Patent should be read with this correction therein that the same may conform to the record of the case in the Patent Office.

Signed and sealed this 26th day of December, A. D., 1916.

[SEAL.]

R. F. WHITEHEAD,
*Acting Commissioner of Patents.*